(12) United States Patent
Alder et al.

(10) Patent No.: US 10,457,586 B2
(45) Date of Patent: Oct. 29, 2019

(54) CHEMICALLY-STRENGTHENED THIN GLASS SUBSTRATES WITH MODIFIED CURVATURE AND METHODS OF MANUFACTURE

(71) Applicant: PGBC Intellectual Holdings, LLC, Greenwood, AR (US)

(72) Inventors: Richard Ashley Alder, Fort Smith, AR (US); Russell Ashley Alder, Fort Smith, AR (US)

(73) Assignee: PGBC INTELLECTUAL HOLDINGS, LLC, Greenwood, AR (US)

( * ) Notice: Subject to any disclaimer, the term of this patent is extended or adjusted under 35 U.S.C. 154(b) by 0 days.

(21) Appl. No.: 15/786,343

(22) Filed: Oct. 17, 2017

(65) Prior Publication Data
US 2019/0112220 A1 Apr. 18, 2019

(51) Int. Cl.
*C03C 21/00* (2006.01)
*C03C 3/087* (2006.01)
(Continued)

(52) U.S. Cl.
CPC .............. *C03C 3/087* (2013.01); *C03B 18/12* (2013.01); *C03C 17/23* (2013.01); *C03C 21/002* (2013.01)

(58) Field of Classification Search
CPC ....... C03C 3/087; C03C 21/002; C03C 17/23; C03B 18/12
See application file for complete search history.

(56) References Cited

U.S. PATENT DOCUMENTS 9,302,938 B2 4/2016 Kreski
2010/0009154 A1 1/2010 Allan et al.
(Continued)

FOREIGN PATENT DOCUMENTS

WO WO 2014/130515 A1 8/2014
WO WO 2015/156262 A1 10/2015
(Continued)

OTHER PUBLICATIONS

International Search Report and Written Opinion of the International Searching Authority issued in the corresponding International Application No. PCT/US2018/056222 dated Jan. 22, 2019 (PCT/ISA/220, PCT/ISA/210, and PCT/ISA/237).

*Primary Examiner* — Laura A Auer
(74) *Attorney, Agent, or Firm* — Birch, Stewart, Kolasch & Birch, LLP

(57) ABSTRACT

Chemically-strengthened thin glass having modified curvature and a method for making the same. The method includes providing a thin glass substrate which has host alkali ions situated in its surface regions, and possesses a treatment-advantaged surface region and a treatment-disadvantaged surface region located opposing each other; conducting a step of ion-exchange with invasive alkali ions having an average ionic radius larger than the average ionic radius of the host alkali ions, thereby producing a chemically-strengthened substrate which is characterized by an undesired curvature (warpage), and then conducting a step of reverse ion-exchange with reversing alkali ions having an average ionic radius equal to, or smaller than, the average ionic radius of the host alkali ions before ion-exchange, so as to produce a chemically-strengthened substrate having either less curvature or having a predetermined profile of curvature, which is not present in the chemically-strengthened glass substrate prior to reverse ion-exchange.

4 Claims, 6 Drawing Sheets

REVERSE ION EXCHANGE

(51) Int. Cl.
*C03B 18/12* (2006.01)
*C03C 17/23* (2006.01)

(56) References Cited

U.S. PATENT DOCUMENTS

| | | |
|---|---|---|
| 2011/0293928 A1 | 12/2011 | Chu et al. |
| 2012/0194974 A1 | 8/2012 | Weber et al. |
| 2014/0120335 A1 | 5/2014 | Yamanaka et al. |
| 2014/0178663 A1 | 6/2014 | Varshneya et al. |
| 2014/0178689 A1 | 6/2014 | Kreski |
| 2014/0182335 A1* | 7/2014 | Lee ................. C03C 21/008 65/30.14 |
| 2016/0200628 A1* | 7/2016 | Shirai ................ C03C 3/087 65/30.1 |
| 2016/0200629 A1 | 7/2016 | Ikawa et al. |
| 2016/0326050 A1 | 11/2016 | Lee et al. |
| 2017/0334770 A1* | 11/2017 | Luzzato .............. C03C 3/076 |

FOREIGN PATENT DOCUMENTS

| | | | |
|---|---|---|---|
| WO | WO 2016/014937 A1 | 1/2016 | |
| WO | WO-2016149860 A1 * | 9/2016 | ............. C03C 3/087 |

* cited by examiner

REVERSE ION EXCHANGE

CHEMICALLY-STRENGTHENED THIN GLASS SUBSTRATES WITH MODIFIED CURVATURE AND METHODS OF MANUFACTURE

FIELD OF THE INVENTION

The present invention relates generally to chemically-strengthened thin glass. More particularly, the present invention relates to thin glass substrates that have been chemically-strengthened by ion-exchange and which have been modified in curvature by subjecting at least a surface region thereof to a reverse ion-exchange process. The present invention also relates to chemically-strengthened thin glass substrates having reduced or zero curvature, chemically-strengthened thin glass substrates having a predetermined profile of curvature, and to advantageous manufacturing methods for such chemically-strengthened thin glass substrates.

BACKGROUND OF THE INVENTION

As is well recognized in the art, thin glass substrates which have been chemically-strengthened by an ion-exchange process are widely utilized in electronic devices, primarily as cover glasses on the displays of smart phones and tablets. Ion-exchange is a chemical process where host alkali metal atoms within the glass of a smaller ionic radius, typically sodium or lithium, are substituted at the atomic level by invasive alkali metal atoms of a larger ionic radius, typically potassium. Ion-exchange is conventionally conducted by immersing glass substrates in a salt bath, or tank of molten salt, containing potassium nitrate ($KNO_3$). The host alkali metal ions vacate from the glass surface region and the larger invasive alkali metal ions wedge into the voids causing the volume of the glass surface region to expand. Provided the temperature is below that at which the glass network structure can relax, a shallow but high-level of compressive stress is formed in the glass surface region. This compressive stress increases surface hardness to resist the formation of scratches, and forces closed microscopic flaws at or near the surface thereby reducing the likelihood of crack propagation on impact or load and thus greatly enhancing glass strength.

Glass substrates for chemical-strengthening by ion-exchange may be of any one of a number of alkali containing recipes where smaller host alkali metal ions are available in the glass surface region for substitution. Traditional soda-lime silicate glass, that which is encountered in common window glass, may be chemically-strengthened by ion-exchange. Other alkali containing glass recipes including alkali-aluminosilicate glass, alkali-borosilicate glass, alkali-aluminoborosilicate glass, alkali-boron glass, alkali-germinate glass, and alkali-borogermanate glass may also be chemically-strengthened by ion-exchange. The alkali-aluminosilicate glass may be a sodium alkali-aluminosilicate, or the less common lithium alkali-aluminosilicate, specifically formulated for "high ion-exchange" with sodium or lithium host-alkali metal atoms readily available in the surface region for rapid substitution. Such alkali-aluminosilicate glass recipes more quickly achieve high levels of surface region compressive stress (CS) and high depths of compressive layer (DOL) during the ion-exchange process.

Thin alkali containing glass substrates are currently manufactured by one of two primary methods or variants thereof, the fusion process and the float process.

The fusion process pioneered by CORNING® Incorporated of Corning N.Y. is used to produce thin substrates of alkali-containing glass, namely of sodium alkali-aluminosilicate recipes, which are commercially available in a thickness ranging from 0.4 mm to 2.0 mm. These substrates are collectively known by the trademark name of GORILLA® Glass after being subject to chemical-strengthening by ion-exchange. The fusion process is an overflow down draw method where molten glass flows around a forming structure, or isopipe, creating two downwardly moving ribbons of glass which are fused into a single glass ribbon at the bottom of the forming structure, or root of the isopipe. The fused glass ribbon is pulled vertically downward away from the isopipe by a system of guide rollers while cooling. Upon cooling at the bottom end of the draw, individual glass substrates are cut from the vertically moving fused glass ribbon by a travelling anvil method to become raw sheets suitable for dimensional fabrication and strengthening by ion-exchange.

The fusion process manufactures thin glass substrates of good flatness and excellent optical quality. The opposing top surface regions of the molten glass ribbons which proceed downward on both sides of the isopipe and become the major outer surface regions of the fused glass ribbon are processed free of contact in the molten state and remain ultimately pristine. However, the fusion process is a slow and expensive process which is difficult to control across larger widths, for example greater than 2,000 mm, or when producing longer substrates which increase the weight of glass suspended beneath the isopipe. Cutting the downwardly moving glass ribbon requires steps be taken to minimize forces traveling upstream to where the ribbon remains in a softened state. The glass ribbon especially if wide or thin may be deliberately curved during the fusion process to simplify drawing but at a penalty of imparting differential annealing histories to the opposing glass surface regions. During later ion-exchange this differential results in a mild asymmetry of salt-ion diffusion between the opposing surface regions. One surface region is mildly "treatment-advantaged" compared to the other surface region being mildly "treatment-disadvantaged", both in the quantity of salt-ions entering the glass surface region and the depth to which such salt-ions progress.

The float process is also used to produce thin substrates of alkali containing glass. The Pilkington subsidiary of Nippon Sheet Glass Co., Ltd. (NSG) of Japan produces thin substrates of a soda-lime silicate glass recipe in thicknesses less than 3.0 mm to as thin as 1.0 mm thickness. These substrates in a thickness of 1.6 mm and thinner are collectively known by their trademark names of MICROFLOAT™ and MICROWHITE™ depending on the amount of iron present in their composition. Additionally, the Asahi Glass Co., Ltd. (AGC) of Japan has pioneered the use of the float process to produce thin substrates of a 'high ion-exchange' sodium alkali-aluminosilicate recipe which are commercially available in a thickness ranging from approximately 0.1 mm to 2.0 mm. These substrates are collectively known by their trademark names of DRAGONTRAIL® and LEOFLEX® after being subject to chemical-strengthening by ion-exchange. The float process is a horizontal production method where molten glass flows over a weir and onto the top of liquid tin metal, or a float bath, from where it is pulled as a ribbon which may be further thinned by additional drawing. The horizontally moving glass travels through an annealing lehr (i.e., a temperature-controlled kiln for annealing glass objects) and is then cut into raw sheets suitable for dimensional fabrication and strengthening by ion-exchange.

The float process allows the manufacture of thin glass substrates of excellent flatness and good optical quality. The glass ribbon can be larger widths, for example 3,300 mm, and since the cutting process occurs many meters downstream from where the softened ribbon of glass is exiting the float bath, substrates may be readily cut in longer lengths without impact to upstream glass. Furthermore, the float process allows for the efficient production of high glass tonnages at low cost. However, substrates produced by the float process suffer from a distinct and ubiquitous problem, a microscopic layer of tin remains embedded in the glass. While tin from the bath can be found in both major surface regions of float produced glass, the lower surface region in direct contact with the metallic tin bath, the tin side, acquires substantially more tin contamination than the upper surface region, known in the art as the non-tin side. During later ion-exchange this differential results in a substantive asymmetry of salt-ion diffusion between the opposing surface regions. As a result, the non-tin side surface region is "treatment-advantaged" compared to the tin side surface region being "treatment-disadvantaged", both in the quantity of salt-ions entering the glass surface region and the depth to which such salt-ions progress.

Larger invasive salt-ions crowd into the surface regions of the glass substrate during ion-exchange compressing the surface regions and causing a simultaneous expansion in their volume. When the salt-ion uptake is asymmetrical between the opposing major surface regions then the expansion of each major surface region occurs by differing amounts. Both expanded surface regions pivot about a central region of tension with the resulting dimensional differences being accommodated by deformation of the thin glass substrate into a curved body (also referred to as bow or bend or warpage). That is, the asymmetry of salt-ion diffusion during ion-exchange causes thin chemically-strengthened glass substrates to develop a curvature, deviating in shape from that of a true flat plane. Curvature may be defined as the difference in distance on the z-axis exceeding that of glass thickness between higher and lower points on the substrate from an imaginary flat plane bisecting the thickness centerline. The differential tin contamination of the surface regions in thin float produced glass causes a curvature which is an order of magnitude greater than that which occurs due to differential annealing histories on the surface regions of fusion drawn glass. Indeed, typically when a thin substrate of sufficient size is made by the float process, following ion-exchange, it becomes noticeably concave in shape on the tin-side, convex in shape on the non-tin side, and thereby resembles a shallow dish.

Outside obvious aesthetic requirements for flatness, control of curvature out-of-plane in thin chemically-strengthened substrates is a definitive functional requirement for many glass applications. For touch displays, a thin glass substrate is generally assembled as a component to a multi-layer stack where curvature may cause gapping between layers resulting in irregularities of luminance or Newton rings. For electronics or solar applications, curvature may complicate the adhesion and quality level of applied films or coatings such as Indium Tin Oxide. Architectural and transportation applications typically require thin chemically-strengthened glass substrates be laminated to another substrate of glass, or adhered to an object, for which curvature may cause edge curl or ripple formations. Even when thin glass is used as a layer within an insulating glass unit (IGU) or vacuum insulating glass (VIG) to create an additional hermetically sealed void, a warped substrate may experience a washboard effect where the direction of curvature reverses under load or the sidewalls of cavities are in unacceptable contact.

PRIOR ART METHODOLOGIES

The prior art contains numerous efforts to reduce the curvature caused by the unbalanced expansion of major glass surface regions during ion-exchange, especially that of the magnitude which occurs with float produced glass. Such efforts can be divided into two groups. Firstly there has been a group of methods disclosed aimed at reducing the uptake salt-ions in the treatment-advantaged surface region, the non-tin side with minimal tin contamination on float produced glass substrates. Secondly there has been a group of methods aimed at increasing the uptake of salt-ions in the treatment-disadvantaged side, the tin side with major tin contamination on float produced glass substrates. The goal of each of these methods, albeit by a different set of approaches, has been to promote greater balance in invasive ion uptake into the opposing surface regions during ion-exchange so the level of curvature may be reduced.

The prior art reflects a wide variety of methods for controlling curvature in thin chemically-strengthened glass substrates employing various approaches. Documents disclosing some prior art methods are listed below.

U.S. Pat. No. 9,302,938 (Kreski US '938) discloses a chemically-strengthened glass and a method for making utilizing differential areal density. The method includes providing an ion-exchange medium characterized by having an areal density of invasive alkali ions and a modified ion-exchange medium characterized by having a modified areal density of invasive alkali ions and conducting ion-exchange to produce the strengthened substrate.

In Kreski US '938, a deductive approach is provided. Its differential density method puts forward the use of a salt paste containing clay particles to reduce the overall concentration of invasive salt ions presented to the treatment-advantaged surface region. However what is not stated is that it is extremely difficult to keep such clay particles homogeneously diffused within the salt paste during ion-exchange. Such clay particles may migrate toward or away from the glass surface region producing uneven results. Furthermore, the clay particles may adhere to the outer face of the glass surface region and thus may be difficult to clean away following ion-exchange. Finally, the quantity of clay particles added to the paste on the treatment-advantaged surface region is inevitably predictive in nature. Should the rate of invasive ion uptake fluctuate on the ion-exchanged surface regions, which it can do, then such a zero point is dynamic and requires constant adjustment of the concentration of clay particles differentially applied to the ion-exchange surface regions. Additionally such adjustments are time consuming and uneconomical given the method requires long hours of salt paste preparation, application, and drying time additional to the period of ion-exchange US 2014/0178691 (Kreski US '691) discloses a chemically-strengthened glass and a method for making utilizing differential chemistry. The method includes providing an ion-exchange medium characterized by a composition associated with an ion-exchange rate of invasive alkali ions and a modified ion-exchange medium including a modified composition associated with a modified ion-exchange rate of the invasive alkali ions and conducting ion-exchange to produce the strengthened substrate.

Kreski US '691 in its differential chemistry disclosure reveals adding a "poison" to a salt paste applied to the treatment-advantaged surface region. For example he puts forward mixing a "poisoning" additive of sodium nitrate ($NaNO_3$) or calcium nitrate ($Ca(NO_3)_2$) in with the potassium nitrate ($KNO_3$) paste to reduce the uptake of larger potassium ions during the ion-exchange process. Similar to the differential density patent, the clay particles used as rheological agent in the paste may be difficult to remove after ion-exchange. Again this deductive method postulates that the zero point of symmetrical uptake of larger invasive ions may be correctly predicted prior to ion-exchange. However the correctness of such a prediction without knowledge of the actual practical differences in the uptake of invasive ions between the ion-exchanged surface regions prior to completion offers no simple or economic steps for remediation if such a prediction proves to be inaccurate.

US 2016/0200629 (Ikawa et al. US '629) discloses a method for manufacturing float glass where in the forming step a fluid containing a molecule having a fluorine atom is sprayed onto the glass ribbon. That is, the application of molecules containing fluorine is another method which has been offered for reducing the uptake of salt-ions in the treatment-advantaged surface region of float glass during ion-exchange.

Ikawa et al. US '629 discloses where fluorine atoms are added to the non-tin side in the float bath to reduce later reactivity with salt-ions during the ion-exchange process. The disclosure describes a complex phenomenon of fluorine promoted relaxation of compressive stress, inhibition of ion-exchange, de-alkalization, molecular changes to the glass structure, and dehydration. However the application of fluorine, for example by hydrofluoric gas, induces a tradeoff between adequate fluorine concentration and pitting damage to the glass surface. Fluorine containing compounds are caustic to the refractory lining of the tin bath and may induce the formation of stones in the molten glass. Also, the addition of fluorine atoms occurs during the forming stage of a continuously drawn glass ribbon and is thus removed by both time and tonnage from the process of ion-exchange. If the fluorine concentration is found to be inadequate for achieving symmetry between ion-exchanged surface regions during ion-exchange then at best future production may be adjusted and at worst a large quantity of glass may need to be discarded.

US 2011/0293928 (Chu et al. US '928) discloses a method for strengthening glass whereby a barrier film is formed on a glass surface region to limit the quantity of ions entering during ion-exchange strengthening with the intention of controlling curvature. Such a film is taught as being composed of silicon dioxide ($SiO_2$), titanium dioxide ($TiO_2$), tantalic oxide ($Ta_2O_5$), or niobium oxide ($Nb_2O_5$).

However, the formation of a metallic barrier film on all or part of the treatment-advantaged surface region to reduce the quantity of ions entering during ion-exchange is also less desirable. A metallic barrier film is vulnerable to damage due to handling of the glass substrates after coating. Also the metallic barrier film may be degraded by the thermal profile of time at temperature to which the glass is exposed during ion-exchange. Additionally other coatings or films may be applied on the non-tin side after ion-exchange and the metal barrier layer may interfere with their application or longevity. Finally barrier film methods, and indeed any others within the group, are inevitably deductive based on the overall quantity of salt-ions entering a surface region of the glass substrate and therefore a constant risk remains that surface region compressive stress may be insufficient or uneven potentially resulting in localized weakness and unsatisfactory curvature control.

US 2014/0178689 (Kreski US '689) discloses a chemically-strengthened glass and a method for making utilizing differential time. The method includes applying an ion-exchange medium including invasive alkali ions to a surface region of the treatment-rich volume for a period of time and applying the ion-exchange medium to a surface region of the treatment-poor volume for a modified period of time and conducting ion-exchange to produce the strengthened substrate.

Kreski US '689 in its differential time disclosure teaches extending the time by which the treatment-disadvantaged surface region is subject to invasive ions as another method to increase its salt ion uptake. It discloses applying a salt paste containing potassium nitrate and clay to the tin side which is then subjected to an extended time period of ion-exchange over and above that to which the non-tin side is subjected. However such a method inevitably extends the time required to complete the ion-exchange process over and above the long application and drying time of the clay salt paste. Additionally the method is subject to the variations imbued by the mobility of the clay particles themselves and cleaning the clay particles from the glass after ion-exchange is problematic. Finally like his other two methods provided in Kreski US '691 and Kreski US '938, the primary criticism is that such a method is innately predictive as to the amount of curvature which will be encountered and the additional time necessary for it to be offset. Should such a prediction prove inaccurate no simple and economic means are presented for remediation.

US 2014/0178663 (Varshneya et al. US '663) discloses a method for manufacturing chemically-strengthened glass with reduced induced curvature and a method of making utilizing heat-treatment. The method includes heating the provided substrate to a heat-treating temperature for a heat-treating period to produce a heat-treated substrate then applying an ion-exchange medium including invasive alkali ions and conducting ion-exchange to produce the strengthened substrate with reduced induced curvature.

Varshneya et al. US '663 put forward a method in its heat-treatment disclosure which seeks to increase the uptake of salt-ions in the treatment-disadvantaged surface region. This method teaches thin glass substrates may be soaked at a high-temperature for a period of time in order to oxidize the tin metal in float produced glass. It is noted that such heat-treatment can at best only reduce the amount of curvature incurred during later ion-exchange. It is not possible with this method to eliminate curvature (warpage). Additionally heat-treatment for a specified period of time consumes additional energy and extends the production time. Furthermore, it is difficult to conduct in a production environment due to the need to load and unload weaker, and not strengthened, thin glass substrates to a heat-treating furnace prior to ion-exchange without incurring breakage or damage to the surface regions.

US 2014/0120335 (Yamanaka et al. US '335) discloses methods to reduce curvature in chemically-strengthened float glass by decreasing the difference between the compressive stress of the tin versus non-tin side in the float glass itself by slowing conveyance speed, polishing or etching the glass ribbon, and performing an annealing treatment on reheated float glass.

Physically removing the tin invaded layer of the surface region in float produced glass is a method which has been put forward to increase the uptake of salt-ions in the treatment-disadvantaged surface region during ion-exchange. In this method, the part of the surface region containing the metallic tin metal is laboriously ground and polished away.

However, the invasive tin exists in the glass surface regions in higher quantities to a depth of up to typically 5 µm, and in lower quantities to a depth of as much as 20 µm. Grinding and polishing across the entire surface region of a glass substrate to such a depth is difficult to accomplish without breakage. Secondly, defects may be introduced into the glass surface region which results in additional flaws which ion-exchange is simply attempting to force closed. Thirdly, physical removal of a surface region layer may result in unintended variations to the thickness of the glass substrate. Finally and most unfavorably, such a method is expensive and thus an impractical alternative to fusion produced thin glass substrates.

WO 2015/156262 (Nakagawa et al. WO '262) discloses a method for manufacturing chemically-strengthened glass where a salt paste is applied simultaneously to all surface regions of the glass substrate followed by firing of the substrate in a furnace with different thermal profiles applied to each surface region of the glass so as to incur varying levels of ion-exchange to balance compressive stress so as to reduce curvature.

The use of differential surface region temperatures during ion-exchange is another method which has been disclosed to increase the uptake of salt-ions in the treatment-disadvantaged surface region during ion-exchange. A salt paste containing potassium is applied across all surface regions of the glass and the substrate is moved into a furnace with plates of differing heat-capacity placed against one or both major glass surface regions to subject each surface region to a differential thermal profile of time at temperature. Since the uptake of salt-ions is increased at higher temperatures, the goal is to balance the overall uptake of ions between the surface regions by exposing each major surface region simultaneously to a differing thermal profile. However the application of plates against the glass surface regions may result in scratches or abrasions. Furthermore, such a method relies on an accurate control of temperature on each ion-exchanged surface region which is difficult to achieve in a furnace environment especially given the small distance between surfaces in a thin substrate.

WO 2014/130515 (Allan et al. WO '515) discloses methods for quantifying the asymmetry of glass substrates produced by a particular manufacturing process after undergoing ion-exchange strengthening.

Thus, despite numerous prior attempts at perfecting flatness in thin glass substrates which are chemically-strengthened by a process of ion-exchange, the issue of curvature (or bow or bend or warpage) remains.

Each of the following United States Patents and United States Patent Publications, which are discussed above in the background disclosure, are herein incorporated-by-reference in their entirety:
U.S. Pat. No. 9,302,938 (Kreski US '938),
US 2011/0293928 (Chu et al. US '928),
US 2014/0120335 (Yamanaka et al. US '335),
US 2014/0178663 (Varshneya et al. US '663),
US 2014/0178691 (Kreski US '691),
US 2014/0178689 (Kreski US '689), and
US 2016/0200629 (Ikawa et al. US '629)

SUMMARY OF THE INVENTION

Based on the above noted deficiencies in the art, there are herein noted various non-limiting objects of the invention for overcoming such deficiencies, which non-limiting objects include at least the following.

A reduction in the amount of curvature on float produced substrates after chemical-strengthening by ion-exchange is an object of this invention. A reduction in the amount of curvature by an order of magnitude on float produced substrates to a level equivalent to the curvature on fusion produced substrates not subject to remediation is an object of the invention. A reduction in the amount of curvature on float produced substrates to a level less than the curvature on fusion produced substrates not subject to remediation is an object of the invention. A reduction in the amount of curvature on fusion and float produced substrates to a level less than the curvature on fusion produced substrates not subject to remediation is an object of this invention.

Additionally, it is an object of this invention that such a reduction to curvature is accomplished efficiently with regards to both time and cost. It is also an object of the invention that reductions to curvature exact a minimal penalty to the level and depth of surface region compressive stress compared to that achievable where no attempt is made to mitigate curvature. Furthermore, it is an object of the invention that if the amount of reduction to the curvature is found insufficient then a simple and economic means is available to undergo additional remediation. Finally, it is an object of the invention that a chemically-strengthened substrate may instead be purposefully produced with a predetermined profile of curvature which was not present in the chemically-strengthened glass substrate prior to reverse ion-exchange. Finally, the creation of improved chemically-strengthened thin glass substrates and advantageous methods for their manufacture utilizing therein reverse ion-exchange are objects of this invention.

In one embodiment of the invention, an inventive method is provided for making a chemically-strengthened thin glass substrate that includes changing the chemical structure of one or more surface regions of the thin glass substrate. The chemical structure of the thin glass substrate contains host alkali ions having an average ionic radius present in the surface region, with the substrate containing both a "treatment-advantaged surface region" and a "treatment-disadvantaged surface region" that oppose each other, such as typically due to formation of the thin glass substrate by a float process.

In the inventive method, an ion-exchange medium, including invasive alkali ions having an average ionic radius larger than the average ionic radius of the host alkali ions, is applied to the glass surface regions, and ion-exchange is conducted while applying the ion-exchange medium to the glass surface regions of the thin glass substrate, thereby producing a chemically-strengthened glass substrate.

In the inventive method, a reverse ion-exchange medium is applied to at least a surface region of the chemically-strengthened glass substrate. The reverse ion-exchange medium includes alkali ions having an average ionic radius that is equal to, or smaller than, the average ionic radius of host alkali ions before ion-exchange.

In particular, the inventive method comprises applying a reverse ion-exchange medium to at least a treatment-advantaged surface region, and conducting reverse ion-exchange while applying the reverse ion-exchange medium to produce a chemically-strengthened substrate with reduced or zero curvature—that is, with less curvature (or bow or bend or warpage) than was present in the chemically-strengthened glass substrate prior to reverse ion-exchange.

Alternatively, the inventive method comprises applying a reverse ion-exchange medium to at least one of a treatment-advantaged surface region or treatment-disadvantaged surface region on a chemically-strengthened glass substrate, and conducting reverse ion-exchange while applying the reverse ion-exchange medium to produce a chemically-strengthened substrate with a predetermined profile of curvature that is different from that present in the chemically-strengthened glass substrate prior to carrying out the reverse ion-exchange.

In another embodiment of the invention there is provided an article of a thin glass substrate with reduced or zero curvature that has been chemically-strengthened by ion-exchange and then having select strengthening compressive stresses slightly relaxed by applying a reverse ion-exchange medium and conducting reverse ion-exchange to at least a treatment-advantaged surface region thereof that has been chemically-strengthened by ion-exchange.

In another embodiment of the invention, there is provided an article of a thin glass substrate with reduced or zero curvature that has been chemically-strengthened by ion-exchange and then having select strengthening compressive stresses slightly relaxed by applying a reverse ion-exchange medium and conducting reverse ion-exchange to at least a treatment-advantaged surface region thereof that has been chemically-strengthened by ion-exchange, wherein the glass substrate has a chemical structure which includes alkali metal ions. The glass substrate has a treatment-advantaged surface region and a treatment-disadvantaged surface region located opposing each other. The treatment-disadvantaged surface region and the treatment-advantaged surface region each contain alkali metal ions extending to a diffusion depth which are in a concentration greater in the surface regions than in the remaining glass substrate. In a depth extending from the surface to 5 µm, the average ionic radius of the alkali metal ions located in the treatment-disadvantaged surface region is greater than the average ionic radius of the alkali ions located in the treatment-advantaged surface region. In a depth extending from 5 µm to the depth of diffusion, the average ionic radius of the alkali metal ions located in the treatment-advantaged surface region is greater than the average ionic radius of the alkali ions located in the treatment-disadvantaged surface region.

In another embodiment of the invention, there is provided an article of a thin glass substrate with reduced or zero curvature that has been chemically-strengthened by ion-exchange and then having select strengthening compressive stresses slightly relaxed by applying a reverse ion-exchange medium and conducting reverse ion-exchange to at least a treatment-advantaged surface region thereof that has been chemically-strengthened by ion-exchange, wherein the glass substrate has a chemical structure which includes alkali metal ions. The glass substrate has a treatment-advantaged surface region and a treatment-disadvantaged surface region located opposing each other. A glass substrate produced by the float process contains tin ions in its surface regions, with the treatment-disadvantaged surface containing tin ions in a concentration greater than in the treatment-advantaged surface region. The treatment-disadvantaged surface region and the treatment-advantaged surface region each contain alkali metal ions extending to a diffusion depth which are in a concentration greater in the surface regions than in the remaining glass substrate. In a depth extending from the surface to 5 µm, the average ionic radius of the alkali metal ions located in the treatment-disadvantaged surface region is greater than the average ionic radius of the alkali ions located in the treatment-advantaged surface region. In a depth extending from 5 µm to the depth of diffusion, the average ionic radius of the alkali metal ions located in the treatment-advantaged surface region is greater than the average ionic radius of the alkali ions located in the treatment-disadvantaged surface region.

In another embodiment of the invention there is provided an article of a thin glass substrate with a predetermined profile of curvature that has been chemically-strengthened by ion-exchange and then having select strengthening compressive stresses slightly relaxed by applying a reverse ion-exchange medium and conducting reverse ion-exchange to at least a treatment-advantaged surface or a treatment-disadvantaged surface region thereof that has been chemically-strengthened by ion-exchange.

In another embodiment of the invention, there is provided an article of a thin glass substrate with a predetermined profile of curvature, that has been chemically-strengthened by ion-exchange and then having select strengthening compressive stresses slightly relaxed by applying a reverse ion-exchange medium and conducting reverse ion-exchange to a treatment-advantaged surface region thereof that has been chemically-strengthened by ion-exchange, wherein the glass substrate has a chemical structure which includes alkali metal ions. The glass substrate has a treatment-advantaged surface region and a treatment-disadvantaged surface region located opposing each other. The treatment-disadvantaged surface region and the treatment-advantaged surface region each contain alkali metal ions extending to a diffusion depth which are in a concentration greater in the surface regions than in the remaining glass substrate. In a depth extending from the surface to 5 µm, the average ionic radius of the alkali metal ions located in the treatment-disadvantaged surface region is greater than the average ionic radius of the alkali ions located in the treatment-advantaged surface region. In a depth extending from 5 µm to the depth of diffusion, the average ionic radius of the alkali metal ions located in the treatment-advantaged surface region is greater than the average ionic radius of the alkali ions located in the treatment-disadvantaged surface region.

In another embodiment of the invention, there is provided an article of a thin glass substrate with a predetermined profile of curvature that has been chemically-strengthened by ion-exchange and then having select strengthening compressive stresses slightly relaxed by applying a reverse ion-exchange medium and conducting reverse ion-exchange to a treatment-advantaged surface region thereof that has been chemically-strengthened by ion-exchange, wherein the glass substrate has a chemical structure which includes alkali metal ions. The glass substrate has a treatment-advantaged surface region and a treatment-disadvantaged surface region located opposing each other. A glass substrate produced by the float process contains tin ions in its surface regions, with the treatment-disadvantaged surface containing tin ions in a concentration greater than in the treatment-advantaged surface region. The treatment-disadvantaged surface region and the treatment-advantaged surface region each contain alkali metal ions extending to a diffusion depth which are in a concentration greater in the surface regions than in the remaining glass substrate. In a depth extending from the surface to 5 µm, the average ionic radius of the alkali metal ions located in the treatment-disadvantaged surface region is greater than the average ionic radius of the alkali ions located in the treatment-advantaged surface region. In a depth extending from 5 µm to the depth of diffusion, the average ionic radius of the alkali metal ions located in the treatment-advantaged surface region is greater than the average ionic radius of the alkali ions located in the treatment-disadvantaged surface region.

In a further embodiment of the invention, there is provided an article of manufacture made by a process such as herein described which includes a chemically-strengthened thin glass substrate having less curvature than was present in the chemically-strengthened glass substrate prior to reverse ion-exchange.

In yet a further embodiment of the invention, there is an article of manufacture made by a process such as herein described which includes a chemically-strengthened substrate having a predetermined profile of curvature which was not present in the chemically strengthened glass substrate prior to reverse ion-exchange.

The above summary is not intended to describe each embodiment or every implementation of the invention. Further features and various advantages are outlined in the accompanying drawings and the following detailed description of the invention.

BRIEF DESCRIPTION OF THE DRAWINGS

The drawings which accompany this application form part of the disclosure, but are illustrative only, and should not be construed as limiting the scope of the invention, which scope is defined by the appended claims. In the drawings:

DETAILED DESCRIPTION OF THE INVENTION

For simplicity and illustrative purposes, the present invention is described by referring mainly to embodiments, principles and examples thereof. In the following description, numerous specific details are set forth in order to provide a thorough understanding of the examples. It is readily apparent however, that the embodiments may be practiced without limitation to these specific details. In other instances, some embodiments have not been described in detail so as not to unnecessarily or unduly limit the description. Furthermore, different embodiments are described below. The embodiments may be used separately or performed together in different combinations, as will be readily recognized by those having ordinary skill in the art.

The present invention provides a method that is useful for making chemically-strengthened thin glass substrates, which is particularly advantageous for producing chemically-strengthened thin glass with less curvature (i.e., having reduced curvature or zero curvature). The provided method also allows one to modify the curvature present in a chemically-strengthened thin glass substrate to thereby arrive at a predetermined profile of curvature. Furthermore, a chemically-strengthened glass substrate is provided, which having been treated with a reverse ion-exchange process in accordance with the provided inventive methods fully avoids many of the problems and difficulties that have been previously encountered in producing chemically-strengthened thin glass substrates having reduced or zero curvature, or alternatively having a predetermined profile of curvature.

Figure 1:
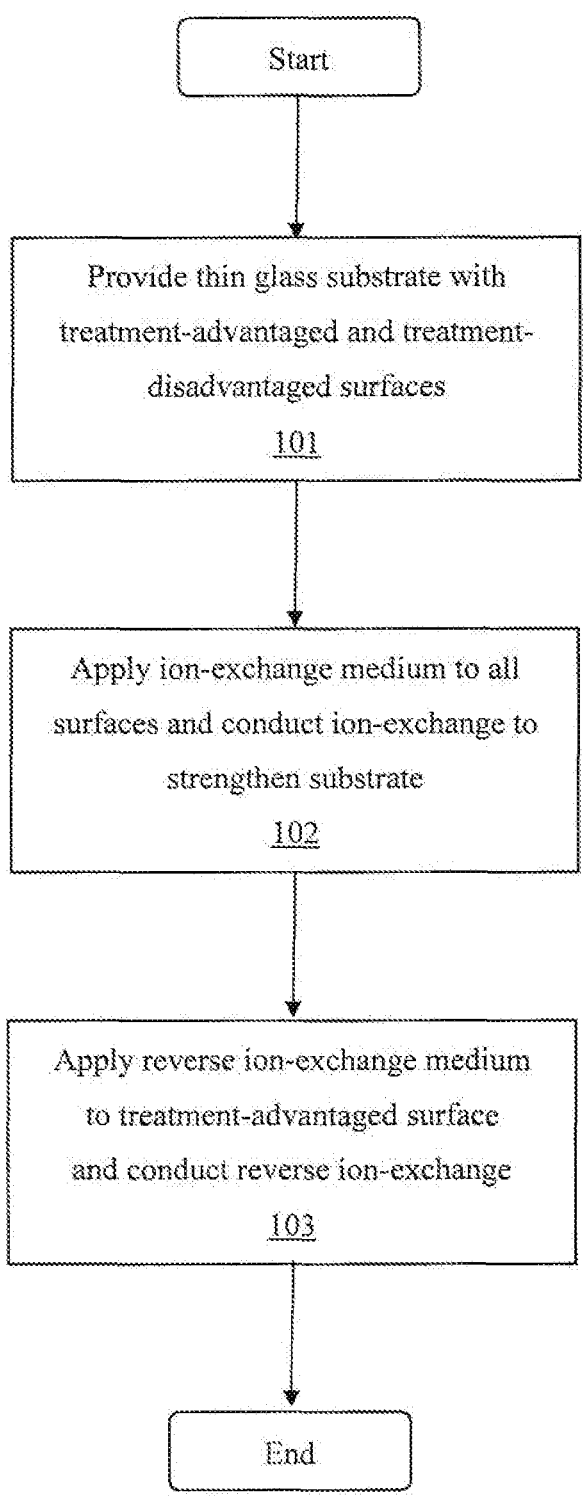
FIG. 1 is a flowchart illustrating an exemplary method of the present invention.

FIG. 1 is a flowchart illustrating an exemplary overview of an implementation described within the disclosure.

As shown in FIG. 1, at step 101, a thin glass substrate is provided that contains a treatment-advantaged surface region and a treatment-disadvantaged surface region.

The thin glass substrate has host alkali ions having an average ionic radius situated in the surface region. The glass substrate has a treatment-advantaged surface region and a treatment-disadvantaged surface region located opposing each other. There is provided an ion-exchange medium which includes invasive alkali ions having an average ionic radius that is larger than the average ionic radius of the host alkali ions being substituted.

At step 102, an ion-exchange medium is applied to the surfaces and ion-exchange is conducted to chemically-strengthen the thin glass substrate. The ion-exchange medium being typically applied to the edges and both of the glass surface regions (i.e., the treatment-advantaged surface region and a treatment-disadvantaged surface region that are located opposing each other) and ion-exchange being conducted, there is produced a chemically-strengthened thin glass substrate which ordinarily reveals a curvature in its dimensional characteristics.

At step 103, a reverse ion-exchange medium is applied to at least the treatment-advantaged surface region and reverse ion-exchange is conducted. The reverse ion-exchange medium contains reversing alkali ions having an average ionic radius that is equal to, or smaller than, the average ionic radius of the host alkali ions before ion-exchange, and it is normally applied to the "treatment-advantaged surface region" and reverse ion-exchange is conducted in order to reduce curvature in the chemically-strengthened substrate.

Figure 5:
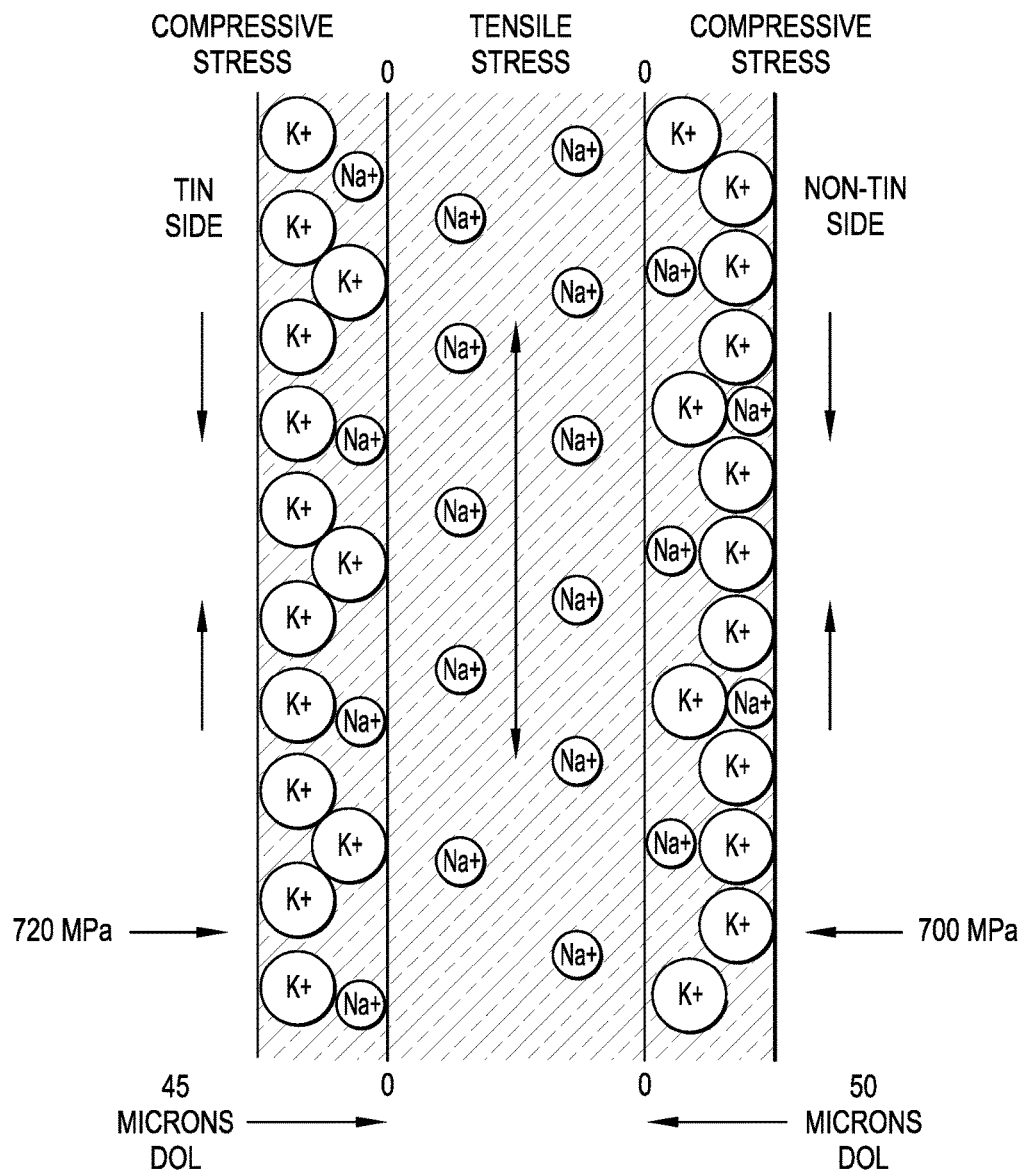
FIG. 5 depicts a cross-section of a chemically-strengthened thin glass sheet of the present invention, and illustrates hypothetical relative ion concentrations and compressive forces present in the chemically-strengthened thin glass sheet of the invention, and wherein the thin glass sheet is one that is prepared by a tin float process.

While the reverse ion-exchange medium is applied, in step 103, a slight relaxation of compressive stresses occurs in the approximate first 5 microns (μm) or less of the treatment-advantaged surface region. The chemically-strengthened substrate which results has less induced curvature resulting from the step of ion-exchange because of the reverse ion-exchange process. Without wishing to be bound by theory, it appears conducting a step of reverse ion-exchange on the treatment-advantaged surface region of a chemically-strengthened glass substrate reduces the sum total of compressive stress in the treatment-advantaged surface region to the lower level of compressive stress in the treatment-disadvantaged surface region, thereby nullifying the curvature added by the step of ion-exchange which would otherwise be present in the chemically-strengthened glass substrate. FIG. 5 is a sketch depicting such compressive stress in a glass substrate.

Alternatively, in much the same way that reducing the curvature in a chemically-strengthened thin glass substrate can be achieved by way of the inventive methods, so also the achievement of a predetermined profile of curvature can be imparted to a previously chemically-strengthened thin glass substrate, by use of a method of the instant invention, wherein a process of reverse ion-exchange is carried out on at least one of a treatment-advantaged surface region or a treatment-disadvantaged surface region of a chemically-strengthened glass substrate. The thin glass substrate may additionally be heated above the softening temperature of the glass and thermally bent to the shape of a mold or tool to impart an initial profile of curvature prior to the steps of ion-exchange and reverse ion-exchange.

The operation and effects of certain embodiments can be more fully appreciated from the examples, as described below. The embodiments on which these examples are based are representative only. The selection of these embodiments to illustrate the principles of the invention does not indicate that materials, components, reactants, conditions, techniques, configurations and designs, etc., which are not described in the examples are not suitable for use, or that subject matter not described in the examples is excluded from the scope of the appended claims or their equivalents. The significance of the examples may be better understood by comparing the results obtained therein with potential results which may be obtained from tests or trials that may be, or may have been, designed to serve as controlled experiments and to provide a basis for comparison.

Exemplary Thin Glass Substrates

As used herein a glass substrate means any kind of ion-exchangeable glass. Ion-exchangeable is defined to mean a glass capable of exchanging host alkali ions, or those alkali metal ions located in the glass structure at or near the surface. Exemplary alkali-containing glasses including alkali-aluminosilicate glass, soda-lime silicate glass, alkali-borosilicate glass, alkali-aluminoborosilicate glass, alkali-boron glass, alkali-germinate glass, and alkali-borogermanate glass may be chemically-strengthened by ion-exchange. Glass of an alkali-aluminosilicate recipe may be further termed as a sodium alkali-aluminosilicate or a lithium alkali-aluminosilicate depending upon which species of host alkali ion is present within the glass chemical structure.

Such alkali containing glass substrates which are the subject of this disclosure may be further defined as those which are thin, typically being less than 3.0 mm in thickness, and more preferably 2.0 mm in thickness or thinner. Thin glass substrates may for example possess a thickness of 2.7 mm, 2.5 mm, 2.0 mm, 1.6 mm, 1.5 mm, 1.3 mm, 1.1 mm, 1.0 mm, 0.85 mm, 0.8 mm, 0.7 mm, 0.55 mm, 0.4 mm, and have even been manufactured as thin as 0.1 mm (100 µm) and 0.05 mm (50 µm). At thicknesses of 3.0 mm or greater, the glass substrate can typically gain enough rigidity that curvature ceases to be induced during chemical-strengthening by ion-exchange. At a thickness of 1.5 mm or thinner, curvature can typically become a problem of substantial magnitude as the rigidity of glass sheets to resist flexure declines as a function of the cube of the substrate thickness.

An exemplary embodiment of a recipe/formulation for a sodium alkali-aluminosilicate glass contains 60-65 mol % $SiO_2$, 10-15 mol % $Na_2O$, 10-15 mol % $Al_2O_3$, 6-9 mol % MgO, 4-8 mol % $K_2O$, and 0.5-2.0 mol % $ZrO_2$.

Another suitable recipe/formulation for a sodium alkali-aluminosilicate glass contains 66.7 mol % $SiO_2$, 13.8 mol % $Na_2O$, 10.5 mol % $Al_2O_3$, 5.5 mol % MgO, 2.06 mol % $K_2O$, 0.64 mol % $B_2O_3$, 0.46 mol % CaO, 0.34 mol % $As_2O_3$, 0.01 mol % $ZrO_2$, and 0.007 mol % $Fe_2O_3$.

In another suitable embodiment, a recipe/formulation for a sodium alkali-aluminosilicate glass contains 66.9 mol % $SiO_2$, 10.1 mol $Al_2O_3$, 8.39 mol % $K_2O$, 7.45 mol % $Na_2O$, 5.78 mol % MgO, 0.58 mol % $B_2O_3$, 0.58 mol % CaO, 0.2 mol % $SnO_2$, 0.01 mol % $ZrO_2$, and 0.01 mol % $Fe_2O_3$.

In another embodiment, a composition for a lithium alkali-aluminosilicate substrate is 61 mol % $SiO_2$, 18 mol % $Al_2O_3$, 10 mol % $Na_2O$, 5% mol $Li_2O$, 3 mol % $ZrO_2$, 1 mol % $K_2O$, 1 mol % CaO, and 1 mol % $B_2O_3$.

In a further embodiment, another suitable recipe/formulation for a lithium alkali-aluminosilicate substrate is 67.2 mol % $SiO_2$, 20.1 mol % $Al_2O_3$, 3.2% mol $Li_2O$, 2.7 mol % $TiO_2$, 1.7 mol % ZnO, 1.7 mol % $ZrO_2$, 1.1 mol % MgO, 0.9 mol % BaO, 0.4 mol % $Na_2O$, 0.23 mol % $K_2O$, and 0.05 mol % CaO.

In another exemplary embodiment, a recipe/formulation of soda-lime silicate glass is 70 mol % $SiO_2$, 13 mol % $Na_2O$, 10 mol % CaO, 4 mol % MgO, 2 mol % $Al_2O_3$, and 1 mol % $K_2O$.

In a further embodiment, a recipe/formulation of a clear soda-lime silicate glass is 72.0-73.0 mol % $SiO_2$, 13.0-13.5 mol % $Na_2O$, 8.6-8.9 mol % CaO, 4.1-4.3 mol % MgO, 0.5-0.7 mol % $Al_2O_3$, 0.2-0.4 mol % $K_2O$, and 0.07-0.13 $Fe_2O_3$.

In a further exemplary embodiment, a recipe/formulation of a low-iron ultra-clear soda-lime silicate glass is 72.3 mol % $SiO_2$, 13.3 mol % $Na_2O$, 8.8 mol % CaO, 4.3 mol % MgO, 0.5 mol % $Al_2O_3$, 0.4 mol % $K_2O$, and <0.02 $Fe_2O_3$.

The above described embodiments are merely illustrative of typical and/or conventional formulations used in producing alkali-aluminosilicate glass, e.g., sodium and lithium alkali-aluminosilicate glass, soda-lime silicate glass and low-iron ultra-clear soda-lime silicate glass. As such, the same formulations are in no way considered limitative of the inventive concepts herein disclosed.

Substrate glasses have variations within their opposing surface regions which affect the propensity for ions to ion-exchange during chemical-strengthening. A variation may exist between opposing surface regions due to differences in the amount of tin contamination leftover from production of the glass substrate by the float process which acts as a "blocker." A glass substrate produced by the float process will have a higher amount of tin metal in the "treatment-disadvantaged" surface region than in the "treatment-advantaged" surface region.

A variation may also exist between opposing surface regions due to differences in the annealing histories residually present from production of the glass substrate by the fusion process which forms a more tightly connected glass network structure. The result of such variation is that one surface region is more easily treated by chemical-strengthening and may be termed the "treatment-advantaged" surface region. Conversely, the opposing surface region is less easily treated by chemical-strengthening and thus conversely may be termed the "treatment-disadvantaged" surface region.

For the purpose of introducing a predetermined profile of curvature, the thin glass substrate may additionally be heated above the softening temperature of the glass and thermally bent to the shape of a mold or tool to impart an initial profile of curvature. Contact of the thin glass substrate with the forming tool as well as the effect of geometry on cooling rates, concave versus convex, may impart thermally bent thin glass substrates with yet another differential annealing history regardless as to whether initial production was by the float or fusion method. In fusion produced sheets, the result of such variation is that following bending one surface region is more easily treated by chemical-strengthening and may be termed the "treatment-advantaged" surface region. Conversely, the opposing surface region is less easily treated by chemical-strengthening and thus conversely may be termed the "treatment-disadvantaged" surface region. In float produced sheets, variation due to the annealing history from thermal bending is of a magnitude less than that which is imparted due to the differential tin concentrations in the surface regions. However variation in annealing history due to thermal bending may lessen or enhance the degree to which the non-tin surface region is "treatment-advantaged" and the opposing tin surface region is "treatment-disadvantaged".

Exemplary Ion-Exchange Mediums

As used herein an ion-exchange medium means a solid, liquid, or gas used for chemical-strengthening which contains invasive alkali metal ions. Invasive alkali ions are defined as those alkali metal ions having an average ionic radius that is larger than an average ionic radius of host alkali metal ions in the substrate glass before ion-exchange. Ion-exchange mediums may include one or more different species of invasive alkali ions. The preferred invasive alkali ion for strengthening glass surface regions containing host sodium alkali ions is potassium because it has an average ionic radius larger than the average ionic radius of sodium. Alternately, the preferred invasive alkali ions for strengthening glass surface regions containing host lithium alkali ions is sodium or potassium because both have an average ionic radius larger than the average ionic radius of lithium. However other alkali ions on the periodic table such as rubidium or caesium which are still larger in ionic radius may be included as invasive ions within the ion-exchange medium.

An exemplary embodiment for a liquid ion-exchange medium is potassium nitrate ($KNO_3$) contained within a salt bath, or enclosure containing molten salt, within which the glass substrate is submerged and subject to the application of heat definable by a thermal profile of time at temperature. The liquid ion-exchange medium contained within a salt bath simultaneously contacts all surfaces of the glass substrate including its edges. In this non-limiting example, invasive alkali ions of potassium migrate from the potassium nitrate liquid medium into the surfaces of the glass substrate and host alkali ions such as sodium migrate out of the surfaces of the glass substrate into the liquid medium. Such a liquid ion-exchange medium is an exemplary embodiment for strengthening an alkali containing glass substrate by ion-exchange.

Another exemplary embodiment for a solid ion-exchange medium is a salt paste containing potassium nitrate and a rheological agent such as kaolin clay which may be applied to all surfaces of the glass substrate including its edges followed by the application of heat definable by a thermal profile of time at temperature. Ion-exchange mediums are typically applied to the perimeter edges and the edges of any perforations if present so as to chemically-strengthen all outer surfaces of the glass substrate. However, the application or non-application of an ion-exchange medium to the edges of the glass substrate is no way considered limitative of the inventive concepts herein disclosed. In this non-limiting example, invasive alkali ions of potassium migrate from the potassium nitrate solid paste medium into the surfaces of the glass substrate and host alkali ions such as sodium migrate out of the surfaces of the glass substrate into the solid paste medium. Such a solid ion-exchange medium is an exemplary embodiment for strengthening an alkali containing glass substrate by ion-exchange.

Gas ion-exchange mediums are also contemplated in addition to liquid and solid ion-exchange mediums. For example, methods are known in the art where a salt compound such as potassium chloride (KCl) is deposited onto the glass surfaces by gas vapor deposition and subject to the application of heat definable by a thermal profile of time at temperature. Such a method may use a hot aerosol generator to create a potassium chloride vapor which contacts all surfaces of the glass substrate including its edges. In this non-limiting example, invasive alkali ions of potassium migrate from the potassium chloride vapor into the surfaces of the glass substrate and host alkali ions such as sodium migrate out of the surfaces of the glass substrate into the vapor medium. Such a gas ion-exchange medium is an exemplary embodiment for strengthening an alkali containing glass substrate by ion-exchange The configuration of the ion-exchange medium may be modified in density with greater or lesser concentration of one or more species of invasive alkali ions presented to the surface regions. It is noted that the concentration of invasive alkali metal ions presented to the surface regions can be varied by adjusting which alkali metal salt compound is used. Examples of salt compounds are alkali metal nitrates, sulfates, halides, phosphates, carbonates, and chlorides, which contain invasive alkali metal ions in different densities. For instance, potassium nitrate ($KNO_3$) has a molar mass of 101.10 g/mol of which the single potassium ion represents 38.7% of its molar mass. The density of potassium nitrate at 20° C. is 2.11 $g/cm^3$ and thus the concentration of potassium ions is 0.817 $g/cm^3$ at the said temperature. In contrast, potassium chloride (KCl) has a molar mass of 74.55 g/mol of which the single potassium ion represents 52.4% of the mass. The density of potassium chloride at 20° C. is 1.98 $g/cm^3$, and thus the concentration of potassium ions by mass is 1.038 $g/cm^3$ at said temperature. While density changes with temperature, an ion-exchange medium of potassium nitrate salt may be said to contain a different concentration of invasive potassium alkali metal ions than is contained within an ion-exchange medium of potassium chloride of an equal volume at identical temperature.

The concentration of invasive alkali metal ions in the ion-exchange medium, and their availability for inter-diffusion, may also be varied by the inclusion of other additives in the ion-exchange medium that may also impart specific properties. The ion-exchange medium may include additives of clay such as for example kaolin, or solvents such as for example glycerol or diethylene glycol, which may reduce the concentration of invasive alkali-metal ions. The ion-exchange medium may include a percentage of alkali ions which are of an average ionic radius equivalent to, or smaller than, the host alkali ions in the glass substrate before ion-exchange (i.e., so called "mixed salt baths" known in the art). For example the ion-exchange medium may include sodium ions where such a species is not actually the invasive alkali ion such as when sodium and potassium are both constituents of the ion-exchange medium applied to a sodium alkali-aluminosilicate glass. The ion-exchange medium may include a percentage of metal ions for adding color or germ resistance; such as for example copper ions or silver ions respectively. Finally, the ion-exchange medium may include a percentage of alkaline earth ions, which may act as a poison to inter-diffusion during ion-exchange, such as for example magnesium (Mg) ions, calcium (Ca) ions, strontium (Sr) ions or barium (Ba) ions.

Exemplary Ion-Exchanged Glass

Ion-exchanged glass means any alkali-containing substrate which has been chemically-strengthened by ion-exchange processing. As used herein, ion-exchange processing is defined as the chemical inducement of compressive stress to strengthen the surface region of a glass substrate by exposure to an ion-exchange medium in the presence of heat definable by a thermal profile of time at temperature. During ion-exchange, host alkali metal ions in a glass substrate vacate from the glass surface region and the larger invasive alkali metal ions present in the ion-exchange medium wedge into the voids causing the volume of the glass surface regions to expand. Provided the temperature is below the annealing temperature of the glass substrate at which the glass network structure can relax, a shallow but high-level of compressive stress is formed in the glass surface region. This compressive stress increases surface region hardness to resist the formation of scratches, and forces closed microscopic flaws at or near the surface thereby reducing the likelihood of crack propagation on impact or load and thus greatly enhancing glass strength.

The ion-exchange rate for a given glass substrate is the net quantity of larger invasive alkali ions substituted in place of smaller host alkali ions in the glass substrate over a period of time and is a function of temperature, the ion-exchange medium, and the chemical structure of the glass substrate. The period of time for conducting ion-exchange may range from as little as a few minutes to as long as 24 hours or greater depending upon the level and depth of compressive stresses and thus strengthening required. The temperature for conducting ion-exchange may be varied but is preferably above 400° C., though typically not to exceed the safe stability of the ion-exchange medium or the annealing temperature of the glass substrate where the glass network structure can relax to accommodate the increased volume of invading alkali ions in the surface region and as a result the compressive stress is lost. While the composition of the ion-exchange medium can be varied, it is required to include alkali metal ions having an average ionic radius larger than the host alkali metal ions in the glass substrate before ion-exchange and in a concentration suitably high so as to induce net ion-exchange in the surface regions of the glass substrate (i.e., the building of compressive stresses).

An exemplary embodiment of ion-exchanged glass is a sodium aluminosilicate glass which has been chemically-strengthened by ion-exchange through submersion for a period of 4 hours in a salt bath containing 100% liquid potassium nitrate at a temperature of 435° C. The resulting chemically-strengthened glass exhibits a compressive stress greatest at the surface and follows a gradient of decline through the diffusion depth of the invasive alkali metal ions terminating at the depth of compressive layer (DOL), the location of zero compressive stress beyond which tensile stresses occur. In such an exemplary embodiment the surface compressive stress is at least 600 MPa and the depth of compressive layer (DOL) is at least 40 µm. Another exemplary embodiment of chemically-strengthened glass is a soda-lime silicate glass which has been chemically-strengthened by ion-exchange through submersion for a period of 4 hours in a salt bath containing 100% liquid potassium nitrate at a temperature of 435° C. The resulting chemically-strengthened glass exhibits a compressive stress greatest at the surface and follows a gradient of decline through the diffusion depth of the invasive alkali metal ions terminating at the depth of compressive layer (DOL). In such an exemplary embodiment the surface compressive stress is at least 300 MPa and the depth of compressive layer (DOL) is at least 15 µm.

Strengthening by ion-exchange is preferably to higher levels of surface compressive stress and higher depths of compressive stress. The level of surface compressive stress in both surface regions of the glass substrate is preferably at least 100 MPa, preferably at least 200 MPa, preferably at least 300 MPa, preferably at least 400 MPa, preferably at least 500 MPa, more preferably at least 600 MPa, and most preferably greater than 700 MPa. Higher levels of surface compressive strength result in greater strength since tensile stresses from impact or loading and need to exceed the surface compressive stress at the tip of a flaw for a crack to propagate and result in breakage. The depth of the compressive stress in both surface regions of the glass substrate is preferably at least 10 µm, preferably at least 15 µm, preferably at least 20 µm, preferably at least 30 µm, more preferably at least 40 µm, more preferably at least 50 µm, more preferably at least 60 µm, and most preferably greater than 75 µm. Higher depths of compressive stress also provide greater resistance to the relief of surface compression by abrasions or scratches which if deep enough may enter the tensile region and result in breakage.

The ion-exchange rate differs between the treatment-advantaged and treatment-disadvantaged surface regions of the glass substrate. Such a characterization refers to the speed with which alkali ion diffusion occurs under equivalent conditions of chemical-strengthening by ion-exchange and is due to the physical characteristics of the glass substrate including those imparted by the method of production, fusion verses float. Indeed when exposed to the same parameters of chemical-strengthening, the treatment-advantaged surface region in sum gains greater compressive stresses than the treatment-disadvantaged surface region. The treatment-advantaged surface region, when compared to the treatment-disadvantaged surface region, may exhibit one or more of a higher level of compressive stress at the surface, a greater depth of compressive layer (DOL), or greater compressive stress within the diffusion gradient between the surface and zero point depth of compressive layer where compressive stresses terminate. As such a surface region may be defined to mean the outermost face of the glass substrate and continuing inward therefrom through the diffusion gradient for the invasive alkali ions to the depth of compressed layer (DOL).

Furthermore, the ion-exchange step may be purposefully modified to impart a greater or lesser curvature exceeding that which otherwise results due to the physical characteristics of the glass substrate including those imparted by the method of production, fusion verses float. This may be accomplished by conducting ion-exchange which differs between one surface region or part thereof and the opposing surface region or part thereof in at least one of barrier film, temperature, period of time, or configuration of ion-exchange medium including in at least one of the volume of the ion-exchange medium, the species of invasive alkali ions contained therein, the concentration of a species of invasive alkali ions contained therein, and the inclusion of additives therein which modify the rate of ion-exchange, etc. Differing ion-exchange between one surface region or part thereof, and the opposing surface region or part thereof, may be selectively used to induce a differential expansion of surface region volumes to induce greater or lesser curvature. Furthermore it is contemplated this may be accomplished along a specific dimensional axis in one or more areas of the surface by conducting a second step of ion-exchange with an ion-exchange medium again containing invasive alkali ions, for example larger rubidium ions, which are selectively applied to all or part of a glass surface region in a geometric pattern such as dots or lines with alternating spaces there between absent of ion-exchange medium to induce localized directional compression.

Additionally, the ion-exchanged chemically-strengthened glass may be produced with greater compressive stress than otherwise is required by the glass application so as to generate a "reservoir" of compressive stress for further modification during a step of reverse ion-exchange as further outlined in the disclosed inventive methods. Alternately, for the purpose of deliberately inducing a more radical profile of curvature into a chemically-strengthened glass substrate, as previously mentioned it is possible the glass substrate may have been heated above the softening temperature of the glass and thermally bent to the shape of a mold or tool to impart an initial profile of curvature before ion-exchange. However such a step may inevitably impart a differential annealing history to the curved glass substrate which causes the profile of curvature to change during ion-exchange that is in addition to any asymmetry between surface regions which may result from differential tin contamination of the surface regions of a float produced substrate.

Regardless as to what steps are taken to purposefully impart a greater or lesser curvature during ion-exchange step, the expansion of the treatment-advantaged verses treatment-disadvantaged surface regions occurs by differing amounts. Physical characteristics present in the substrate before ion-exchange, namely tin contamination or differential annealing histories result in asymmetrical volume expansion in the treatment-advantaged and treatment-disadvantaged surface region during the step of ion-exchange. Indeed typically beneficial properties imparted by ion-exchange such as high levels of compressive stress and deep diffusion depths may magnify the differential uptake of ions between surface regions and thus induce greater curvature in sheets where flatness, that is reduced or zero curvature is desired. A differential expansion of surface region volumes and thus an undesired change to the curvature of the substrate occurs during ion-exchange regardless as to what additional methods are employed to lessen or enhance curvature to a predetermined level during ion-exchange, if any.

Regardless of the cause of such differential uptake of salt ions during ion-exchange, the expanded surface regions pivot about a central region of tension and the resulting dimensional differences are accommodated by deformation to the shape of the thin chemically-strengthened glass substrate. Such deformation occurs additional to any curvature exhibited by the thin glass substrate prior to ion-exchange, be that a profile of curvature imparted by an optional step of thermal bending before ion-exchange or small deviations from flatness resulting from the tolerances of primary production by the float or fusion process. For example, an otherwise flat thin glass substrate deforms during chemical-strengthening by ion-exchange into a curved body deviating from that of a true flat plane. Indeed on float produced glass substrates, the chemically-strengthened glass substrate may deform so much as to resemble a shallow dish following ion-exchange. Even a chemically-strengthened glass substrates previously shaped by a thermal bending step reveals a changed profile of curvature after ion-exchange. As previously stated, curvature is the difference in distance on the z-axis exceeding that of glass thickness between higher and lower points on the substrate from an imaginary flat plane bisecting the thickness centerline. Profile of curvature is an accumulation of such points in space to define the dimensional shape of a curved body.

Exemplary Reverse Ion-Exchange Mediums

As used herein a reverse ion-exchange medium means a solid, liquid, or gas used for reverse ion-exchange which includes reversing alkali ions. Reversing alkali ions are defined as those alkali metal ions having an average ionic radius that is equal to, or smaller than, the average ionic radius of host alkali metal ions in the substrate glass before ion-exchange. Reverse ion-exchange mediums may include one or more species of reversing alkali ion. The preferred reversing alkali ion for relaxing a glass surface region containing sodium host alkali ions before ion-exchange is sodium because it has an average ionic radius equal to the average ionic radius of the host alkali ions of sodium in the glass surface region before ion-exchange. However the reversing alkali ion for relaxing a glass surface region containing sodium host alkali ions before ion-exchange may also be lithium because it has an average ionic radius smaller than the average ionic radius of the sodium host alkali ions in the glass surface region before ion-exchange. Alternately, the preferred reversing alkali ions for relaxing a glass surface region containing lithium host alkali ions before ion-exchange is lithium because it has an average ionic radius equal to the average ionic radius of the lithium host alkali ions in the glass surface region before ion-exchange.

An exemplary embodiment for a solid reverse ion-exchange medium is a hot eutectic one-to-one (w/w) mixture of sodium nitrate ($NaNO_3$) and sodium carbonate ($Na_2CO_3$) which is sprayed onto the treatment-advantaged surface region as an aqueous solution which is then dried leaving behind a eutectic coating on the glass surface of two crystallized salt compounds containing reversing alkali ions. The glass substrate is then subject to the application of heat definable by a thermal profile of time at temperature. Such a liquid reverse ion-exchange medium is an exemplary embodiment for relaxing by reverse ion-exchange a treatment-advantaged surface region of an alkali containing glass substrate. Another exemplary embodiment for a solid reverse ion-exchange medium is a salt paste containing sodium nitrate and a rheological agent such as kaolin clay which may be applied to the treatment-advantaged surface region of the glass substrate then dried. The glass substrate is then subject to the application of heat definable by a thermal profile of time at temperature. Such a solid reverse ion-exchange medium is an exemplary embodiment for relaxing a treatment-advantaged surface region of chemically-strengthened glass substrate by reverse ion-exchange. Gas and liquid reverse ion-exchange mediums are also contemplated in addition to solid reverse ion-exchange mediums.

The configuration of the reverse ion-exchange medium may be modified in density with greater or lesser concentrations of one or more species of reversing alkali ions presented to the surface region. It is noted the concentration of reverse alkali metal ions can be varied by adjusting which alkali metal salt compound, or combination thereof, is used. Examples of salt compounds are alkali metal nitrates, sulfates, halides, phosphates, carbonates, and chlorides, which contain reverse alkali metal ions in different densities. For instance, sodium nitrate ($NaNO_3$) has a molar mass of 84.99 g/mol of which the single sodium ion represents 27.0% of its molar mass. The density of sodium nitrate at 20° C. is 2.26 g/cm$^3$ and thus the concentration of sodium ions is 0.610 g/cm$^3$ at the said temperature. In contrast, sodium carbonate ($Na_2CO_3$) has a molar mass of 105.988 g/mol, of which the two sodium ions represents 43.4% of the mass. The density of sodium carbonate at 20° C. is 2.54 g/cm$^3$ and thus the concentration of sodium ions by mass is 1.102 g/cm$^3$ at said temperature. While density changes with temperature, a reverse ion-exchange medium of sodium nitrate salt may be said to contain a different concentration of reversing sodium alkali metal ions than is contained within a reverse ion-exchange medium of sodium carbonate of an equal volume at identical temperature.

The concentration of reverse alkali metal ions in the reverse ion-exchange medium, and their availability for inter-diffusion, may also be varied by the inclusion of other additives that may also impart specific properties. The reverse ion-exchange medium may include additives of clay such as for example kaolin, or solvents such as for example glycerol or diethylene glycol, which may reduce the concentration of reverse alkali-metal ions. It is contemplated, though certainly not required, that the reverse ion-exchange medium may include a percentage of alkali ions which are larger in average ionic radius larger than the host-alkali ions in the glass substrate before ion-exchange. For example the reverse ion-exchange medium may include a percentage of potassium ions to slow the reverse ion-exchange process. It is contemplated the reverse ion-exchange medium may include a percentage of metal ions for adding color or germ resistance, such as for example copper ions or silver ions respectively. Finally, it is contemplated the reverse ion-exchange medium may include a percentage of alkaline earth ions, which may act as a poison to inter-diffusion during reverse ion-exchange, such as for example magnesium (Mg) ions, calcium (Ca) ions, strontium (Sr) ions, or barium (Ba) ions.

Exemplary Reverse Ion-Exchange Processing

Figure 4A:
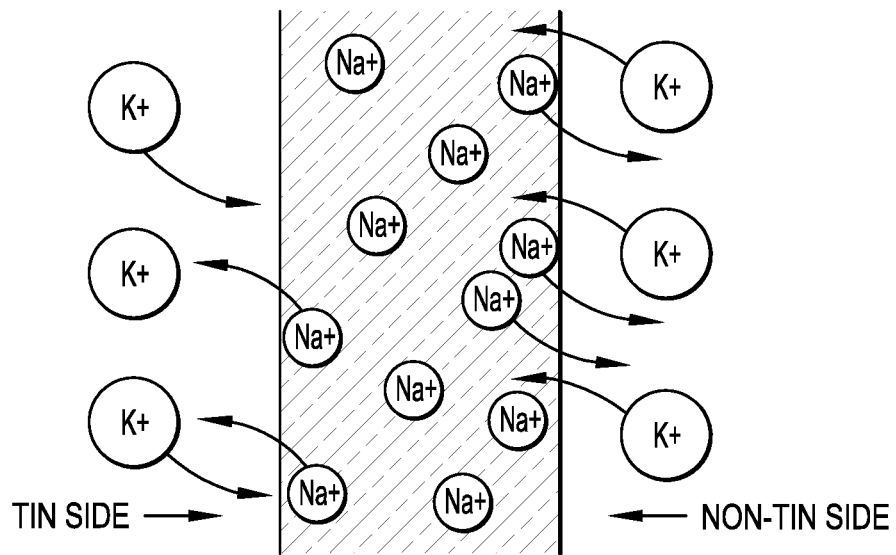
FIG. 4A depicts a cross-section of a glass sheet prepared by a tin float process, and illustrates conventional chemical-strengthening of the glass sheet by ion-exchange.
Figure 4B:
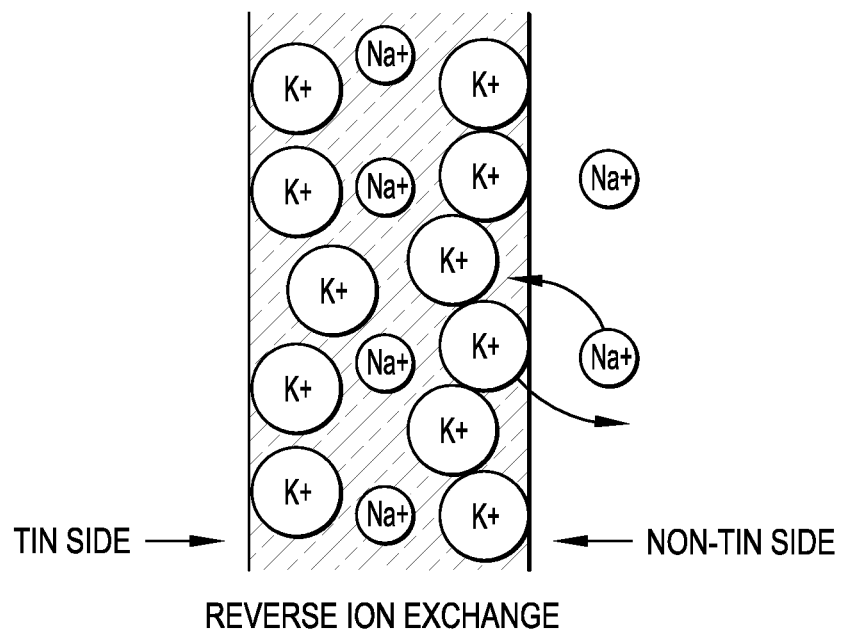
FIG. 4B depicts a cross-section of a chemically-strengthened glass sheet prepared by a tin float process, and illustrates reverse ion-exchange applied to the non-tin side, the treatment-advantaged surface region, of the chemically-strengthened glass sheet.

FIG. 4A and FIG. 4B are sketches relevant to the processing steps as they are utilized and described herein As used herein, reverse ion-exchange processing is defined as the chemical induced relaxation of compressive stress within the chemically-strengthened surface region of a glass substrate by exposure to a reverse ion-exchange medium in the presence of heat definable by a thermal profile of time at temperature. During reverse ion-exchange processing, larger alkali metal ions in the glass substrate vacate from the glass surface region and smaller alkali metal ions in the reverse ion-exchange medium move into the voids causing the volume of the glass surface region to slightly contract. Provided the temperature is above that at which reverse ion-exchange can occur, a slight relaxation can be induced to compressive stresses in a surface region from the surface to preferably no greater than 15 µm in depth, more preferably no greater than 10 µm in depth, and most preferably no greater than 5 µm in depth. Indeed, it is preferred the level of the surface compressive stress in a reverse ion-exchanged surface region declines by no more than 10%, and more preferably by no more than 7.5%, during reverse ion-exchange.

It is preferred when conducting reverse ion-exchange that the temperature remains lower and the period of time shorter so as to minimize any relaxation to the glass network structure and/or the redistribution of larger invasive alkali ions across the breadth of the diffusion depth in the surface regions. Specifically, at higher temperatures and/or longer periods of time the level of compressive stress may decline throughout the diffusion depth of the surface region as the larger invasive alkali metal ions diffuse further into the depth and their concentration gradient flattens across a greater diffusivity volume. An example of such time at temperature is that which occurs during annealing of thin glass substrates at temperatures above 400° C. for multiple hours, for example a thermal profile of 400° C. to 500° C. for 6 to 8 hours. By contrast for the purpose of attaining reduced or zero curvature or a predetermined profile of curvature, it is preferred the temperature remains lower and the period of time shorter so as to induce a controlled relaxation of compressive stress from the surface to more preferably no greater than 10 µm in depth and most preferably to no greater than 5 µm in depth. In this way changes to the level and depth of compressive stress across the breadth of the surface regions due to relaxation of the glass network or ion redistribution which would further alter asymmetry are avoided (i.e., so the amount of stress relaxation required remains static not a "moving target").

The reverse ion-exchange rate for a given glass substrate is the net quantity of smaller ions substituted in place of larger ions in the chemically-strengthened glass substrate over a period of time and is a function of temperature, the reverse ion-exchange medium, and the chemical structure of the glass substrate. The period of time for conducting reverse ion-exchange is preferably less than 30 minutes, more preferably less than 20 minutes, more preferably less than 10 minutes, and most preferably less than 5 minutes, depending upon the decrease of compressive stresses and thus the level of strength relaxation required. The temperature for conducting reverse ion-exchange may be varied but is preferably less than 400° C., more preferably less than 380° C., more preferably less than 360° C., and most preferably less than 340° C. For the purpose of achieving a reduced or zero curvature or a predetermined profile of curvature in the inventive methods and articles provided, it is preferred the thermal profile for reverse ion-exchange is a specific combination of time at temperature suitable to avoid measurable changes to the level and depth of compressive stress across the entire compressed surface regions as a whole (i.e., it is preferred the compressed surface regions ancillary to the shallow depth of reverse ion-exchange remain unaffected).

An exemplary embodiment of a reverse ion-exchanged glass with a reduced or zero curvature is a sodium aluminosilicate glass wherein the treatment-advantaged surface region is relaxed by reverse ion-exchange. A eutectic one-to-one (w/w) mixture of sodium nitrate ($NaNO_3$) and sodium carbonate ($Na_2CO_3$) is sprayed onto the treatment-advantaged surface region in the form of an aqueous solution from which the water is then dried leaving behind a eutectic coating on the glass surface of two crystallized salt compounds containing reversing alkali ions. The glass substrate is then subject to reverse ion-exchange by the application of heat definable by a thermal profile of 4 minutes period of time at a 330° C. temperature. In such an exemplary embodiment, the resulting reverse ion-exchanged chemically-strengthened glass exhibits a slight relaxation in compressive stress in the treatment-advantaged surface region from the surface to about 5 µm in depth while the level of surface compressive stress after reverse ion-exchange remains at least 600 MPa and the depth of compressive layer remains at least 40 µm. The resulting chemically-strengthened substrate has less curvature than is present in the chemically-strengthened glass substrate prior to reverse ion-exchange.

Another exemplary embodiment of a reverse ion-exchanged glass with a reduced or zero curvature is a soda-lime silicate glass wherein the treatment-advantaged surface region is relaxed by reverse ion-exchange. A salt paste containing sodium nitrate ($NaNO_3$) and sodium carbonate ($Na_2CO_3$) and a rheological agent such as kaolin clay is applied to the treatment-advantaged surface region of the glass substrate and dried leaving behind a solid salt-paste. A salt paste containing only sodium nitrate and a greater concentration of kaolin clay is applied to the treatment-disadvantaged surface region of the glass substrate and dried leaving behind a solid salt-paste. In this exemplary example, the reverse ion-exchange mediums have different configurations of areal density with a greater concentration of reversing alkali ions presented to the treatment-advantaged surface region than the treatment-disadvantaged surface region. The glass substrate is then subject to reverse ion-exchange by the application of heat definable by a thermal profile of 4 minutes period of time at a 330° C. temperature. In such an exemplary embodiment, the resulting reverse ion-exchanged chemically-strengthened glass exhibits a slight relaxation in compressive stress in the treatment-disadvantaged surface region, and a comparatively greater relaxation in compressive stress in the treatment-advantaged surface region, from the respective surfaces to about 5 μm in depth while the level of surface compressive stress after reverse ion-exchange remains at least 300 MPa and the depth of compressive layer remains at least 15 μm. The resulting chemically-strengthened substrate has less curvature than is present in the chemically-strengthened glass substrate prior to reverse ion-exchange.

A further exemplary embodiment of a reverse ion-exchanged glass with a predetermined profile of curvature is a sodium aluminosilicate glass wherein conversely the treatment-disadvantaged surface region is relaxed by reverse ion-exchange. A eutectic one-to-one (w/w) mixture of sodium nitrate ($NaNO_3$) and sodium carbonate ($Na_2CO_3$) is sprayed onto the treatment-disadvantaged surface region in the form of an aqueous solution from which the water is then dried leaving behind a eutectic coating on the glass surface of two crystallized salt compounds containing reversing alkali ions. The glass substrate is then subject to reverse ion-exchange with the application of heat definable by a thermal profile of a 6 minute period of time at a 314° C. temperature. In such an exemplary embodiment, the resulting reverse ion-exchanged chemically-strengthened glass exhibits a slight relaxation in compressive stress in the treatment-disadvantaged surface region from the surface to about 5 μm in depth while the level of surface compressive stress after reverse ion-exchange remains at least 600 MPa and the depth of compressive layer remains at least 40 μm. The resulting chemically-strengthened substrate has more curvature than is present in the chemically-strengthened glass substrate prior to reverse ion-exchange. The resulting chemically-strengthened substrate has a predetermined profile of curvature which is not present in the chemically-strengthened glass substrate prior to reverse ion-exchange.

A further exemplary embodiment of a reverse ion-exchanged glass with a predetermined profile of curvature is a sodium aluminosilicate glass which is heated to its softening point and is thermally bent to the shape of a mold followed by chemical-strengthening wherein the treatment-advantaged surface region is relaxed by reverse ion-exchange. A eutectic one-to-one (w/w) mixture of sodium nitrate ($NaNO_3$) and sodium carbonate ($Na_2CO_3$) is sprayed onto the treatment-advantaged surface region in the form of an aqueous solution from which the water is then dried leaving behind a eutectic coating on the glass surface of two crystallized salt compounds containing reversing alkali ions. The glass substrate is then subject to reverse ion-exchange with the application of heat definable by a thermal profile of a 4 minute period of time at a 330° C. temperature. In such an exemplary embodiment, the resulting reverse ion-exchanged chemically-strengthened glass exhibits a slight relaxation in compressive stress in the treatment-advantaged surface region from the surface to about 5 μm in depth while the level of surface compressive stress after reverse ion-exchange remains at least 600 MPa and the depth of compressive layer remains at least 40 μm. The resulting chemically-strengthened substrate has less curvature than is present in the chemically-strengthened glass substrate prior to reverse ion-exchange. The resulting chemically-strengthened substrate has a predetermined profile of curvature which is not present in the chemically-strengthened glass substrate prior to reverse ion-exchange.

The relaxation of compressive stress in at least one surface region by reverse ion-exchange is preferably accomplished without significant reduction to the higher levels of surface compressive stress and higher depths of compressive stress presented after ion-exchange. The level of surface compressive stress in both surface regions of the glass substrate after reverse ion-exchange is preferably at least 100 MPa, more preferably at least 200 MPa, more preferably at least 300 MPa, more preferably at least 400 MPa, more preferably at least 500 MPa, more preferably at least 600 MPa, and most preferably greater than 700 MPa. Reduction to the level of surface compressive stress results in lower strength since tensile stresses from impact or loading may exceed the surface compressive stress at the tip of a flaw for a crack to propagate and result in breakage. The depth of the compressive stress in both surface regions of the glass substrate is preferably at least 10 μm, more preferably at least 15 μm, more preferably at least 20 μm, more preferably at least 30 μm, more preferably at least 40 μm, more preferably at least 50 μm, more preferably at least 60 μm, and most preferably greater than 75 μm. Reduction to the depth of compressive stress results in less resistance to the relief of surface compression by abrasions or scratches which if deep enough may enter the tensile region and result in breakage.

Most typically the reverse ion-exchange process begins with measurement of the curvature present in the thin glass substrate following completion of the step of ion-exchange. A procedure is typically followed where the amount of curvature exhibited by the ion-exchanged glass substrate regardless as to its origin is measured by instrument. Such instruments may include non-contact optical scanners or laser micrometers to quantitatively define the amount of curvature presented by an ion-exchanged glass substrate. Indeed with more sophisticated three dimensional optical surface scans, the amount of curvature out of plane (or that which is desired) may be quantified across localized regions on the glass substrate. For example, a SURPHASER® three dimensional point scanning laser may be used to obtain "point-cloud data" which may be transferred to CAD software to build a representation of the dimensional properties of the thin glass substrate. Regardless of the means by which the measurements are conducted, a net quantity of curvature change can be deduced from that which is present in the thin glass substrate after ion-exchange and that which is desired.

The parameters of reverse ion-exchange may be adjusted relative to the amount of curvature present in the ion-exchanged glass substrate prior to reverse ion-exchange to result in a condition of reduced or zero curvature, or a predetermined profile of curvature, after reverse ion-exchange. From the quantitative definition of the dimensional properties of one, all, or a sampling of thin glass substrates after ion-exchange, a prediction may be made based on the curvature already exhibited by the ion-exchanged glass substrates and the parameters for the reverse ion-exchange process may be adjusted as necessary in order to produce a more accurate prediction for achieving reduced or zero curvature or a predetermined profile of curvature. However it is important to note the modification of curvature including that which has resulted from the asymmetrical expansion of surface volumes is also one of a practical problem in a production environment rather than one which may always be solved by instrumentation measurements and predictive formulas. As such, reverse ion-exchange as a process offers a flexible means with many parameters through which adjustments may be made quickly on the shop floor to achieve a net change to the differential sum of compressive stresses between opposing surface regions in order to produce a chemically-strengthened thin glass substrate which contains reduced or zero curvature or a predetermined profile of curvature There are several parameters by which adjustment may be made to the modification of the curvature of the thin glass substrate during the reverse ion-exchange so as to attain reduced or zero curvature or alternately a predetermined profile of curvature. These are optionally selected by criteria for effectiveness, simplicity, and cost efficiency and may include variation to at least one of time, temperature, and configuration of the reverse ion-exchange medium. Production efficiency warrants that reverse ion-exchange is preferably undertaken over a single thermal profile with a single configuration of reverse ion-exchange medium usually applied to the full-face of typically the treatment-advantaged surface region. However it is possible to conduct reverse ion-exchange with parameters that include more than one thermal profile of time at temperature and/or with more than one configuration of reverse ion-exchange medium. For example, the step of reverse ion-exchange may be repeated one or more times with the same or different parameters if the modification of curvature was found to be unsatisfactory during a previous attempt. The primary limiting factor to reverse ion-exchange is if the level of compressive stress in a reverse ion-exchanged surface is lessened beneath the minimum requirements for the glass application. However, even in such a rare occurrence the substrate ostensibly could again be re-strengthened by ion-exchange, and of course again be subject to reverse ion-exchange (to achieve reduced or zero curvature or a predetermined curvature).

Alteration to the time at temperature is one means of variation for adjusting the modification of the curvature of the thin glass substrate during reverse ion-exchange. For example, the application of heat definable by a thermal profile of time at temperature may be adjusted to include a shorter or longer period of time at greater or lesser temperatures. Conducting reverse ion-exchange at a lower temperature requires a longer time period with a given reverse ion-exchange medium to achieve greater stress relaxation but affords more effectiveness in controlling the level of such relaxation. Again it is generally preferred when conducting reverse ion-exchange that the temperature remain lower and the period of time shorter so as to minimize any relaxation to the glass network structure and/or the redistribution of ions in the diffusion depth beneath the shallow surface region which is being subjected to a step of reverse ion-exchange as well as avoiding substantial change to the entire diffusion depth of any surface region which is not subject to reverse ion-exchange. Indeed, it is preferred to avoid any meaningful change (i.e., change greater than the resolution accuracy of the measuring instrument) to the level and depth of compressive stress in a surface region not directly subject to reverse ion-exchange.

Alteration to the configuration of the reverse ion-exchange medium is another means of variation for adjusting the modification of the curvature of the thin glass substrate during reverse ion-exchange. This is the preferred means in a production environment, be it one of a continuous mechanized line or a batch process, by which to conduct small ongoing adjustments to the modification of the curvature of the thin glass substrate during the reverse ion-exchange so as to attain reduced or zero curvature or alternately a predetermined profile of curvature. Indeed production is preferably arranged to conduct reverse ion-exchange at a set time at temperature and as a result ongoing minor modifications may be made to the reverse ion-exchange step by varying the reverse ion-exchange medium so as to counter smaller differences between the treatment-advantaged and treatment-disadvantaged surface regions between individual thin glass substrates. Indeed, it is possible to adjust the modification of curvature by variation to at least one of volume of the reverse ion-exchange medium, the species of reversing alkali ions contained therein, the concentration of a species of reversing alkali ions contained therein, and the inclusion of additives therein which modify the rate of reverse ion-exchange.

Firstly, the volume of the reverse ion-exchange medium may be varied to a greater or lesser volume to present a larger or smaller quantity of reversing alkali ions to a glass surface region during reverse ion-exchange. A thinner application of reverse ion-exchange medium applied to the glass surface region will more quickly at a given time at temperature become saturated by larger alkali metal ions diffusing out of the glass surface region during reverse ion-exchange and thus more quickly lose its effectiveness for relaxation. A thicker application of reverse ion-exchange medium applied to the glass surface region may contain enough reversing alkali metal ions that variations resulting from lower effectiveness due to the larger alkali metal ions diffusing out of the glass surface region during reverse ion-exchange remains remain for the most part undetectable. As a result, changes to the volume (thickness verses thinness of application) of the reverse ion-exchange medium applied to a glass surface region may be used to vary the relaxation to the compressive stress during reverse ion-exchange and thereby provide adjustment to the modification of curvature in the thin glass substrate.

Secondly, the species of reversing alkali ions within the reverse ion-exchange medium may be varied to present reversing alkali ions of a different average ionic radius to a glass surface region during reverse ion-exchange. A reverse ion-exchange medium which contains a given concentration of lithium ions, as opposed to a reverse ion-exchange medium that contains a given concentration of sodium ions, applied to the glass surface region of a sodium alkali-aluminosilicate glass will more quickly at a given time at temperature reduce the surface volume of the glass surface region during reverse ion-exchange. Furthermore the reversing alkali ions may be a combination of two species of reversing alkali ions, such as for example a mixture of both lithium ions and sodium ions. As a result, changes to the species of reversing alkali ions contained within the reverse ion-exchange medium applied to a glass surface region may be used to vary the relaxation to the compressive stress during reverse ion-exchange and thereby provide adjustment to the modification of curvature in the thin glass substrate.

Thirdly, the concentration of the species of reversing alkali ions within the reverse ion-exchange medium may be varied to present greater or lesser quantities of reversing alkali ions to a glass surface region during reverse ion-exchange. It has previously been noted the concentration of reversing alkali metal ions can be varied in the reverse ion-exchange medium by adjusting which alkali metal salt compound, or combination thereof, is used in the reverse ion-exchange medium. Examples of salt compounds are alkali metal nitrates, sulfates, halides, phosphates, carbonates, and chlorides, which contain reverse alkali metal ions in different densities. For example, the density of sodium ions in a salt compound of sodium carbonate differs from the density of sodium ions in a salt compound of sodium nitrate. Thus a reverse ion-exchange medium which contains a greater concentration of sodium ions in a given volume (i.e., a greater density) when applied to the glass surface region will more quickly at a given time at temperature reduce the surface volume of the glass surface region during reverse ion-exchange. As a result, changes to the concentration of one or more species of reversing alkali ions contained within the reverse ion-exchange medium applied to a glass surface region may be used to vary the relaxation to the compressive stress during reverse ion-exchange and thereby provide adjustment to the modification of curvature in the thin glass substrate.

Finally, the inclusion of additives within the reverse ion-exchange medium may be varied to modify the rate of reverse ion-exchange of the reversing alkali ions presented to a glass surface region during reverse ion-exchange. The rate of reverse ion-exchange medium may be adjusted by the inclusion of additives of clay such as for example kaolin, or solvents such as for example glycerol or diethylene glycol, which reduce the concentration of reverse alkali-metal ions presented to the surface region in the reverse ion-exchange medium. Furthermore it is also contemplated the reverse ion-exchange medium may be modified in chemistry to include an additive such as an alkaline earth ion like calcium or invasive alkali ion such as potassium. For example the addition of a small percentage of alkaline earth ions such as calcium or invasive alkali ions such as potassium may be used to slow the reverse ion-exchange rate of reverse ion-exchange medium by reducing the net rate of reverse ion-exchange of larger ions out of the glass surface region. However the concentration of such additives needs to remain suitably low so as to avoid net ion-exchange (i.e., the building of compressive stress) or the preclusion of reverse ion-exchange (i.e., preventing the compressive stress relaxation). A preferred embodiment of this invention is to conduct reverse ion-exchange with a reverse ion-exchange medium which when applied contains no alkaline earth ions and no invasive alkali-ions.

Furthermore variation of parameters on one or more surface regions or partial areas thereof is another adjustment which may be made to the modification of the curvature of the thin glass substrate during the reverse ion-exchange so as to attain reduced or zero curvature or alternately a predetermined profile of curvature. For example, the application of heat defined by time and temperature may be specific not just to the entire glass substrate but also differently applied to specific areas, be those particular surface regions or areas within those surface regions. Another example is variation to the configuration of the reverse ion-exchange medium which may be differently applied to specific areas, be those particular surface regions or areas within those surface regions. As previously stated, the step of reverse ion-exchange may be repeated one or more times with the same or different parameters which may be extended to include specific areas, be those particular surface regions or areas within those surface regions. The steps of reverse ion-exchange may be conducted simultaneously, sequentially, and in another sequence or combination of sequences. As a result, variation of the parameters to include specific areas, be those particular surface regions or areas within those surface regions thereof, may be used to vary the relaxation to the compressive stress during reverse ion-exchange and thereby provide further adjustment to the modification of the curvature in localized areas of the surface regions by differing amounts.

In a preferred embodiment of this disclosure, there is a method for making a chemically-strengthened thin glass substrate with reduced or zero curvature. A thin glass substrate with a chemical structure in its surface regions is provided. The glass chemical structure includes host alkali ions having an average ionic radius situated in the surface regions of the thin glass substrate. The glass substrate has a treatment-advantaged surface region and a treatment-disadvantaged surface region located opposing each other. The method includes providing an ion-exchange medium. The ion-exchange medium includes invasive alkali ions having an average ionic radius that is larger than the average ionic radius of the host alkali ions. The method includes applying the ion-exchange medium, preferably of an equal configuration to both glass surface regions as well as the edges. The method includes conducting ion-exchange, preferably with equal parameters such as time and temperature, while applying the ion-exchange medium, to produce a chemically-strengthened substrate. The method includes providing a reverse ion-exchange medium. The reverse ion-exchange medium includes reversing alkali ions having an average ionic radius that is equal to, or smaller than, the average ionic radius of host alkali ions before ion-exchange. The method includes applying the reverse ion-exchange medium to at least the treatment-advantaged surface region. The method also includes conducting reverse ion-exchange while applying the reverse ion-exchange medium to produce a chemically-strengthened substrate with a reduced curvature or zero curvature.

Further modifications to the step of reverse ion-exchange are possible in order to produce a chemically-strengthened thin glass substrate which contains reduced or zero curvature following the step of reverse ion-exchange. To obtain reduced or zero curvature, the preferred method is to conduct reverse ion-exchange principally on the treatment-advantaged surface region of the thin glass substrate. However, reverse ion-exchange may also be conducted on the treatment-disadvantaged surface to also relax some of its compressive stress, provided such relaxation of stress is less in sum than that which occurs on the treatment-advantaged surface so the curvature in the glass substrate previously chemically-strengthened by ion-exchange is reduced. The reverse ion-exchange of both surface regions may be conducted simultaneously, sequentially, and in other sequences. For example, if the compressive stress on the treatment-advantaged surface has been too greatly lessened, and the curvature has been reduced beyond a zero curvature and becomes negative, then reverse ion-exchange may be conducted on the treatment-disadvantaged surface region to induce curvature in the opposite direction and thereby remove a negative curvature condition. The reverse ion-exchange of the treatment-disadvantaged surface may be kept suitably less than that initially conducted on treatment-advantaged surface region by variation to at least one of time, temperature, and configuration of the reverse ion-exchange medium so as to attain a further reduced or zero curvature.

In another embodiment of this inventive disclosure, there is a method for making a chemically-strengthened thin glass substrate with a predetermined profile of curvature. A thin glass substrate with a chemical structure in its surface regions is provided. The glass chemical structure includes host alkali ions having an average ionic radius situated in the surface regions of the thin glass substrate. The glass substrate has a treatment-advantaged surface region and a treatment-disadvantaged surface region located opposing each other. The glass substrate may optionally be heated to its softening point then thermally bent to the shape of a tool or mold prior to ion-exchange. The method includes providing an ion-exchange medium. The ion-exchange medium includes invasive alkali ions having an average ionic radius that is larger than the average ionic radius of the host alkali ions. The method includes applying the ion-exchange medium, preferably of an equal configuration to both glass surface regions as well as the edges. The method includes conducting ion-exchange, preferably with equal parameters such as time and temperature while applying the ion-exchange medium, to produce a chemically-strengthened substrate. The method includes providing a reverse ion-exchange medium. The reverse ion-exchange medium includes reversing alkali ions having an average ionic radius that is equal to, or smaller than, the average ionic radius of host alkali ions before ion-exchange. The method includes applying the reverse ion-exchange medium to at least one surface region. The method also includes conducting reverse ion-exchange while applying the reverse ion-exchange medium to produce a chemically-strengthened substrate with a predetermined profile of curvature.

Additional modifications to the step of reverse ion-exchange are possible in order to produce a chemically-strengthened thin glass substrate which contains a predetermined profile of curvature following the step of reverse ion-exchange. For example the reverse ion-exchange medium may be applied conversely to the treatment-disadvantaged surface region and reverse ion-exchange conducted to mildly exaggerate the curvature present after ion-exchange. The reverse ion-exchange medium may be applied absent a band around the perimeter to leave a mild curvature residual from the ion-exchange step in the edge region. Furthermore it is contemplated a reverse ion-exchange medium may be applied to all or part of a glass surface region in a geometric pattern of coverage such as dots or lines with alternating spaces there between absent of reverse ion-exchange medium. Such an application may be used to induce a differential contraction of volumes and thus a mild modification of the curvature along a specific dimensional axis or in one area of the surface region more than another. Additionally, it is contemplated though less preferred that reverse ion-exchange may be conducted on one surface region, or part thereof, while simultaneously conducting strengthening ion-exchange on another surface region, or part thereof, which for example if conducted on the opposing surface region may be used to impart more curvature than only a step of reverse ion-exchange provides.

As previously discussed, the ion-exchange step may have been purposefully modified to impart a greater or lesser curvature exceeding that which otherwise would result due to the physical characteristics of the glass substrate including those imparted by the method of production, fusion verses float. Regardless as to the cause of curvature in the thin glass substrate following the ion-exchange process, a step of reverse ion-exchange may be used to "fine-tune" curvature to a predefined profile of curvature. For example, a spherical curvature profile imparted during the step of ion-exchange may be further flattened or tightened by a step of reverse ion-exchange so as to meet a proscribed tolerance for a predefined profile of curvature. For the purpose of deliberately lessening/enhancing a predetermined profile of curvature, the reverse ion-exchange may be conducted on one or more surface regions or of course may also be applied to just a localized area of the substrate. Furthermore, reverse ion-exchange may be simultaneously conducted on opposing surface regions, or parts thereof, all but with slightly altered parameters of at least one of time, temperature, and configuration of the reverse ion-exchange medium so as to induce slightly different amounts of stress relaxation in the opposing surface regions to afford a finer level of resolution to the "fine-tuning" of the curvature than may be possible with reverse ion-exchange to only a single surface region.

Furthermore modifications to the step of reverse ion-exchange are possible in order to produce a chemically-strengthened thin glass substrate which exhibits an even more radical predetermined profile of curvature following the step of reverse ion-exchange. A thin glass substrate may be subject to a step of thermal bending prior to ion-exchange. Reverse ion-exchange may then be used to "fine-tune" the shape of the thin glass substrate after ion-exchange to the predetermined profile of curvature. For example, reverse ion-exchange may be used to remediate deviations from the predetermined shape caused by bending tolerances both in the tool or form used to impart the shape and/or in deficiencies in which the thin glass substrate matched the shaping tool or form. Furthermore, the step of reverse ion-exchange can be used to adjust for deviations from the predetermined profile of curvature resulting from variations in annealing histories of the surface regions residual from a thermal bending step. Finally, the reverse ion-exchange step can still also be applied to the treatment-disadvantaged surface region to remove variations in symmetry resulting from the physical characteristics of the glass such as the contamination of the surface regions by metallic tin on float produced substrates. The step of reverse ion-exchange thus provides a useful method for further modification to meet a proscribed tolerance for a predefined profile of curvature in a thin glass substrate which has been subject to a step of thermal bending before ion-exchange.

Figure 6:
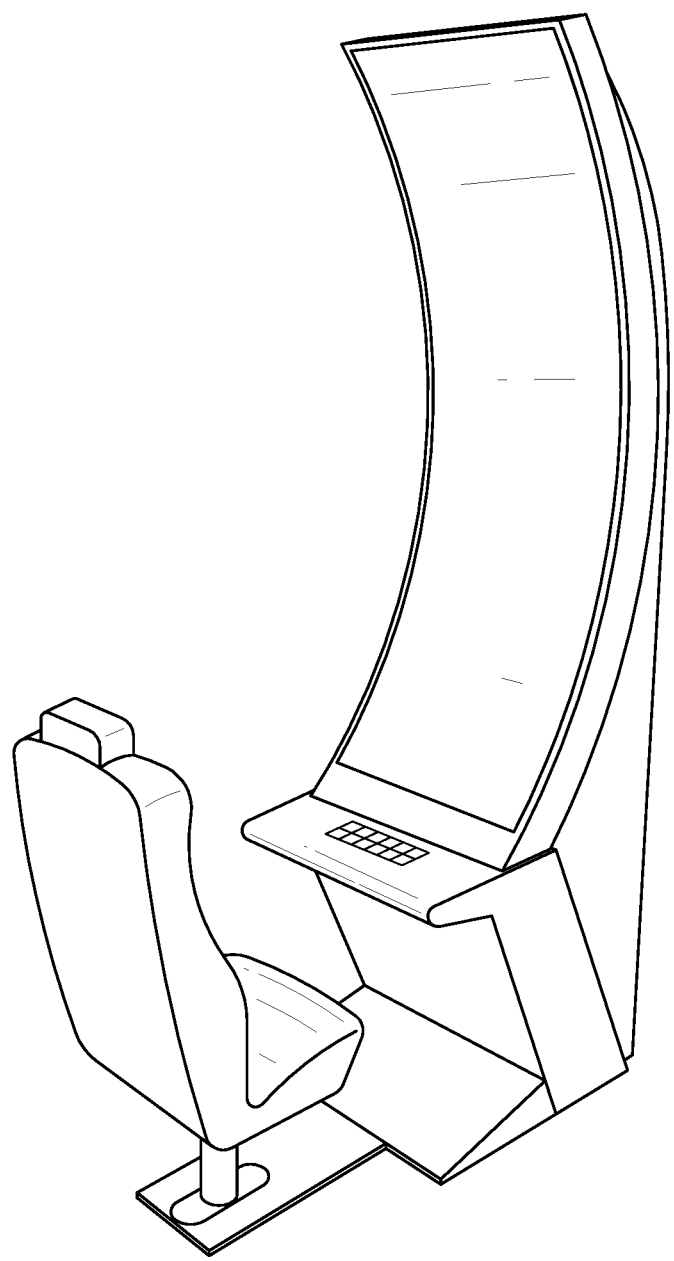
FIG. 6 is a sketch illustrating an exemplary embodiment of a large format gaming console containing a large touchscreen display, wherein a chemically-strengthened thin glass substrate of the present invention having a predetermined profile of curvature is utilized in forming the touchscreen.

FIG. 6 is a sketch illustrating a chemically-strengthened thin glass substrate of the present invention having a predetermined profile of curvature, which is utilized in forming the touchscreen display of a large format gaming console.

The present invention also contemplates and provides for an alternative embodiment, wherein a previously obtained chemically-strengthened thin glass substrate is subject to reverse ion-exchange to impart at least one of the following properties thereto that is not present to the previously obtained chemically-strengthened thin glass substrate: a reduced curvature, or zero curvature, or a predetermined profile of curvature. The method comprises providing a chemically-strengthened reverse ion-exchange medium. The reverse ion-exchange medium may contain reversing alkali ions having an average ionic radius equal to, or smaller than, the average ionic radius of the host alkali ions before ion-exchange (of the obtained chemically-strengthened thin glass substrate) and/or smaller than the average ionic radius of the invasive ions applied during ion-exchange (of the obtained chemically-strengthened thin glass substrate). The method may comprise applying the reverse ion-exchange medium to a surface region of the thin glass substrate. The method may also comprise conducting reverse ion-exchange while applying the reverse ion-exchange medium to produce a chemically-strengthened substrate with a reduced or zero curvature or alternately a predetermined profile of curvature.

The methods put forward in this inventive disclosure allow for a glass substrate to become a high quality chemically-strengthened glass substrate suited to a particular glass application, be it one desiring of excellent flatness or to meet a proscribed tolerance for a predefined profile of curvature.

Exemplary Chemically-Strengthened Glass

Following reverse ion-exchange, the compressive stresses present in ion-exchanged glass exhibit enhanced symmetry between the treatment-advantaged and treatment-disadvantaged surface regions of the glass substrate where reduced or zero curvature is desired. Reverse ion-exchange allows differential speeds of alkali ion diffusion in the surface regions which otherwise occur under equivalent conditions of chemical-strengthening by ion-exchange to be nullified. This can occur regardless of where such curvature originates including that which may be the result of physical characteristics imparted by the method of glass substrate production, e.g., a fusion process verses a float process. The treatment-advantaged surface region can in sum be adjusted to lose its advantage of greater compressive stresses compared to the treatment-disadvantaged surface region. While the state of greater equalization between the treatment-advantaged and treatment-disadvantaged surface is achieved in sum, it is noted the absolute level of compressive stress at the surface, the depth of compressive layer (DOL), and the compressive stress in the layers between the surface and zero point depth of compressive layer (DOL) where compressive stresses terminate often still differ regardless between surface regions. Furthermore, where the end goal is reduced or zero curvature, the symmetry of compressive stress in the opposing surface regions may also be slightly biased to offset any minor deviations from absolute flatness residual from the tolerances of primary production, fusion verses float.

The expansion of the volumes of the treatment-advantaged surface region and treatment-disadvantaged surface regions may be stated to be in greater balance, or symmetry, in sum following the step of reverse ion-exchange where reduced or zero curvature is desired. While the expansion of the surface regions which pivot about a central region of tension is asymmetrical during ion-exchange, the step of reverse ion-exchange allows the volume of the surface region to be reduced so that a state of equilibrium may be established between the opposing surface regions. The resulting dimensional differences between surface regions in sum are minimized and deformation of the thin chemically-strengthened glass substrate into a curved body is nullified. Indeed, it can be stated where reduced or zero curvature is desired that the asymmetry of salt-ion diffusion during ion-exchange may be minimized in sum by the step of reverse ion-exchange so the chemically-strengthened thin glass substrate reveals a reduced, or zero level, curvature from that of a true flat plane.

The use of reverse ion-exchange as a method to achieve reduced or zero curvature imparts specific physical characteristics to the chemically-strengthened glass substrate. Specifically such characteristics can be analyzed by revealing the concentration of specific alkali metal ions species within the various depths of the surface regions of reverse ion-exchanged glass. The instrument used for such analysis is known in the art as a surface ablation cell (SAC). A surface ablation cell is a laboratory device consisting of a pump which transfers an etching solution across a glass surface region to thereby progressively disassemble the glass network and its constituents. Such dissolution occurs in progressive layers optionally proceeding through the diffusion depth until the depth of compressive layer is reached. As the glass network is dissolved, the resulting effluent may be diverted and categorized by the specific depth from within the glass network where it came for qualitative and quantitative analysis. For example, the effluent may be analyzed to determine the concentrations of alkali metal ions within a specific depth of the surface region and thereby reveal the specific characteristics of the inventive article.

In addition to flatness, the use of reverse ion-exchange as a method for attaining reduced or zero curvature results in specific physical characteristics in the chemical-strengthened glass not found in other methods which may be summarized as follows. Firstly, reverse ion-exchange reduces the concentration of larger alkali metal ions only from the surface to typically no greater than 5 μm in depth. Reverse ion-exchange is conducted quickly at a thermal profile (time at temperature) preferably insufficient to cause any substantial change (i.e., greater than 10%) to the level of surface compressive stress on the reverse-exchanged surface region. Secondly while reverse ion-exchange may be optionally performed on both surfaces, where reduced or zero curvature is desired it is normally, if not always, performed to a greater extent on the treatment-advantaged surface region than the treatment-disadvantaged surface region.

The result of these two paradigms is that the composition of the constituent alkali ions presents in these surface regions shifts. The absolute quantity of larger alkali ions may indeed differ between the two surfaces through the diffusion depth since one is treatment-advantaged and the other is treatment-disadvantaged. However more importantly, a shift needs to occur in the composition of the alkali ions since reverse ion-exchange causes more larger alkali metal ions to vacate from the treatment-advantaged surface region (its average ionic radius falls) in the depth extending from the surface to 5 μm than in the treatment-disadvantaged surface region (its average ionic radius may also fall depending on if it also is subject to reverse ion-exchange but since reduced or zero curvature generally mandates reverse ion-exchange on the treatment-disadvantaged surface be conducted to a lesser extent, so its fall would normally be less precipitous).

Reverse ion-exchange again is conducted quickly at a thermal profile (time at temperature) preferably insufficient to cause meaningful change (i.e., greater than the resolution accuracy of the measuring instrument) to the composition of ions including the level and depth of compressive stress in the balance of the diffusion area of a reverse exchanged surface region or in a surface region not subject to reverse ion-exchange. As a result, the region from 5 μm to the diffusion depth retains composition of the constituent alkali ions present in these surface regions from ion-exchange rather than reverse ion-exchange. Again, the absolute quantity of larger alkali ions may indeed differ between the two surfaces in the diffusion depth greater than 5 μm since one is treatment-advantaged and the other is treatment-disadvantaged. However the composition of the alkali ions in this region reflects the bias of the initial ion-exchange treatment, namely more larger alkali metal ions are able to get down into the deeper depths greater than 5 μm of the treatment-advantaged surface region due to an absence of blocking tin ions (that are associated with a tin float glass manufacturing process) or negative annealing history (that are associated with a fusion glass manufacturing process) and the average ionic radius of the alkali ions in this region is thus higher than in the treatment-disadvantaged surface region. Indeed if such a phenomenon was not present then it would not be possible for the chemically-strengthened glass substrate to reveal reduced or zero curvature in accordance with an advantageous embodiment of the present invention.

In contrast to the present invention, all other heretofore know methods in the relevant art are directed at attempting to reduce the overall difference in the concentration of larger invasive alkali ions as compared to smaller host alkali metal ions during the step of ion-exchange. Specifically these methods attempt to modify comparative rates of inter-diffusion which occurs in each surface region from the outermost surface to the depth of diffusion. For example, Kreski US '689 (US 2014/0178689) in its differential time disclosure and Varshneya et al. US '663 (US 2014/0178663) in its heat-treatment disclosure each attempt to increase the quantity of larger invasive alkali ions across the entire breadth of diffusion of the "treatment-poor" surface region by respectively lengthening the comparative time of inter-diffusion between surfaces or oxidizing the blocking tin ions. Similarly, the Kreski US '938 (U.S. Pat. No. 9,302,938) differential density patent disclosure, as well as the Kreski US '691 (US 2014/0178691) differential chemistry disclosure, which may be extended to include the disclosure on a metallic surface barrier film, each attempt to decrease the quantity of larger invasive alkali ions across the entire breadth of diffusion in the "treatment-rich" surface region of the glass substrate.

It is only the reverse ion-exchange concept and framework that are set forth in this disclosure that instead accepts the differential diffusion rates between surface regions during ion-exchange for what they are, quantifies them, and then allows one in an inventive embodiment herein disclosed to slightly and selectively remove larger invasive alkali-ions from the "treatment-advantaged" surface region to a shallow depth so as to achieve greater symmetry of expansion in sum between the two surface regions. Furthermore, the reverse ion-exchange concept and framework allows changes to such symmetry to be purposefully biased to offset any undesired curvature present in the glass substrate before ion-exchange in order to achieve a desired reduction or absence of curvature. Finally, the reverse ion-exchange concept and framework that are set forth in this disclosure also allows manipulation of such symmetry between surface regions to be exploited in order to achieve a desired predetermined profile of curvature not present in the glass prior to reverse ion-exchange.

Thus, there is also provided an article which includes a chemically-strengthened glass substrate with reduced or zero curvature having a chemical structure which includes alkali metal ions. The glass substrate contains a treatment-advantaged surface region and a treatment-disadvantaged surface region located opposing each other. The treatment-disadvantaged surface region and the treatment-advantaged surface region each extend to a diffusion depth of alkali metal ions which are in a concentration greater in the surface regions than in the remaining glass substrate. In a float produced glass substrate, the treatment-disadvantaged surface region and the treatment-advantaged surface region each contain tin ions and the treatment-disadvantaged surface region contains tin ions in a concentration greater than in the treatment-advantaged surface region. In a fusion produced glass substrates, the treatment-disadvantaged surface region has a different annealing history than the treatment-advantaged surface region. In a depth extending from the surface to 5 μm, the average ionic radius of the alkali metal ions located in the treatment-disadvantaged surface region is greater than the average ionic radius of the alkali ions located in the treatment-advantaged surface region, and in a depth extending from 5 μm to the depth of diffusion, the average ionic radius of the alkali metal ions located in the treatment-advantaged surface region is greater than the average ionic radius of the alkali ions located in the treatment-disadvantaged surface region.

Additionally, there is an article of manufacture which includes a chemically-strengthened substrate made by a process such as herein described. The process may comprise providing a thin glass substrate with a chemical structure. The glass chemical structure may contain host alkali ions having an average ionic radius situated in the surface region. The glass substrate may contain a treatment-advantaged surface region and a treatment-disadvantaged surface region located opposing each other. The process may comprise providing an ion-exchange medium. The ion-exchange medium may contain invasive alkali ions having an average ionic radius that is larger than the average ionic radius of the host alkali ions. The process may comprise applying the ion-exchange medium to the glass surface regions. The process may comprise conducting ion-exchange while applying the ion-exchange medium to produce a chemically-strengthened substrate. The process may comprise providing a reverse ion-exchange medium. The reverse ion-exchange medium may contain reversing alkali ions having an average ionic radius that is equal to, or smaller than, the average ionic radius of host alkali ions before ion-exchange and/or it may contain reversing alkali ions smaller than the average ionic radius of the invasive ions applied during ion-exchange. The process may include applying the reverse ion-exchange medium to at least a treatment-advantaged surface region and conducting reverse ion-exchange while applying the reverse ion-exchange medium to produce a chemically-strengthened substrate having less curvature than was present in the chemically-strengthened glass substrate prior to reverse ion-exchange. The process may instead include applying the reverse ion-exchange medium to at least one of a treatment-advantaged surface region or a treatment-disadvantaged surface region and conducting reverse ion-exchange while applying the reverse ion-exchange medium to produce a chemically-strengthened substrate having a predetermined profile of curvature which was not present in the chemically-strengthened glass substrate prior to reverse ion-exchange.

EXAMPLES

The following examples demonstrate methods of making chemically-strengthened glass having reduced or zero curvature, or a predetermined profile of curvature, utilizing a reverse ion-exchange methodology. Reference is made to the graph in FIG. 2 in the examples. The graph shows the deflection of exemplary chemically-strengthened substrates both before and after reverse ion-exchange is conducted at a defined thermal profile of time at temperature. The time at temperature values are shown as the right-hand and bottom scales of the graph, respectively. The deflection measurement for a flat glass having 412 mm span is given in millimeters as shown on the left-hand axis of the graph. Deflection is determined from the surface profile measured by an optical non-contact micrometer to obtain deflection as the peak-to-valley height determined across a line drawn parallel with the long dimension connecting between the short edge mid-points.

In the tables which follow, CS is the level of surface compressive stress, DOL is the depth of compressive layer, and CT is the level of central tension. Throughout the tables within this examples section the following methodology was used: the level of surface compressive stress, depth of layer, and central tension were measured using an FSM-7000H Surface Stress Meter as purchased from the Luceo Co, Ltd of Tokyo, Japan.

Example 1—Reverse Ion-Exchange

Sample Preparation:
Sodium alkali-aluminosilicate glass coupons, 412 mm width×127 mm length and with a 0.55 mm thickness, were cut from different mother sheets of thin glass substrate produced by the float process. The edges as well as both surface regions—that is, the treatment-advantaged surface region and the treatment-disadvantaged surface region—were submerged in a uniform liquid ion-exchange medium of potassium nitrate (KNO$_3$) at a temperature of 432° C. for a period of 210 minutes to conduct strengthening by ion-exchange. Immediately following ion-exchange the coupons were cleaned using warm de-ionized water. The results were as follows:

Sample A

The measured curvature in the glass coupon was a positive 7.1 mm deflection over 412 mm.

| SURFACE REGION | CS | DOL | CT |
|---|---|---|---|
| Treatment-Disadvantaged Surface (Tin Side) | 728 MPa | 45.7 μm | 36.1 MPa |
| Treatment-Advantaged Surface (Non-Tin Side) | 736 MPa | 48.0 μm | 39.2 MPa |

Sample B

The measured curvature in the glass coupon was a positive 5.6 mm deflection over 412 mm.

| SURFACE REGION | CS | DOL | CT |
|---|---|---|---|
| Treatment-Disadvantaged Surface (Tin Side) | 716 MPa | 45.3 μm | 35.7 MPa |
| Treatment-Advantaged Surface (Non-Tin Side) | 725 MPa | 46.2 μm | 36.8 MPa |

Sample C

The measured curvature in the glass coupon was a positive 3.2 mm deflection over 412 mm.

| SURFACE REGION | CS | DOL | CT |
|---|---|---|---|
| Treatment-Disadvantaged Surface (Tin Side) | 735 MPa | 43.4 μm | 35.0 MPa |
| Treatment-Advantaged Surface (Non-Tin Side) | 751 MPa | 48.1 μm | 40.0 MPa |

The deflection measurements of sample A, B, and C are shown on the left hand data points at a temperature of 25° C. after strengthening by ion-exchange but before selective surface relaxation by reverse ion-exchange. These data points are denoted by black circles containing an "x" on the graph in FIG. 2.

Sample Processing: The same sodium alkali-aluminosilicate glass coupons already chemical-strengthened by ion-exchange were then subject to different configurations of reverse ion-exchange.

A eutectic salt mixture in a ratio (w/w) of 1 to 1 of sodium nitrate (NaNO$_3$) and sodium carbonate (Na$_2$CO$_3$) was created and dissolved in de-ionized water to create an aqueous salt solution. The glass coupons were preheated to a temperature of approximate 150° C. and the aqueous solution was applied by a spray method onto only the ion-exchange treatment-advantaged surface (Non-Tin Side). The water in the solution quickly evaporated from the surface leaving behind a solid reverse ion-exchange medium characterized as a eutectic coating on the glass surface of two crystallized salt compounds containing reversing alkali ions of sodium covering the full face of the sprayed surface region. The crystallized salt compounds may best be described as having a consistency similar to the appearance of ice on the surface of an automotive windshield. The amount of sodium salts present on the sprayed surface was found to be approximately 16.1 grams per square meter. Immediately thereafter the coupons were inserted into a furnace to conduct reverse ion-exchange with the application of heat definable by a thermal profile of time at temperature. The time at temperature to which the coupons were exposed was as follows:

Sample A

371° C. for 8 Minutes.

Sample B

349° C. for 4 Minutes.

Sample C

310° C. for 4 Minutes.

Figure 2:
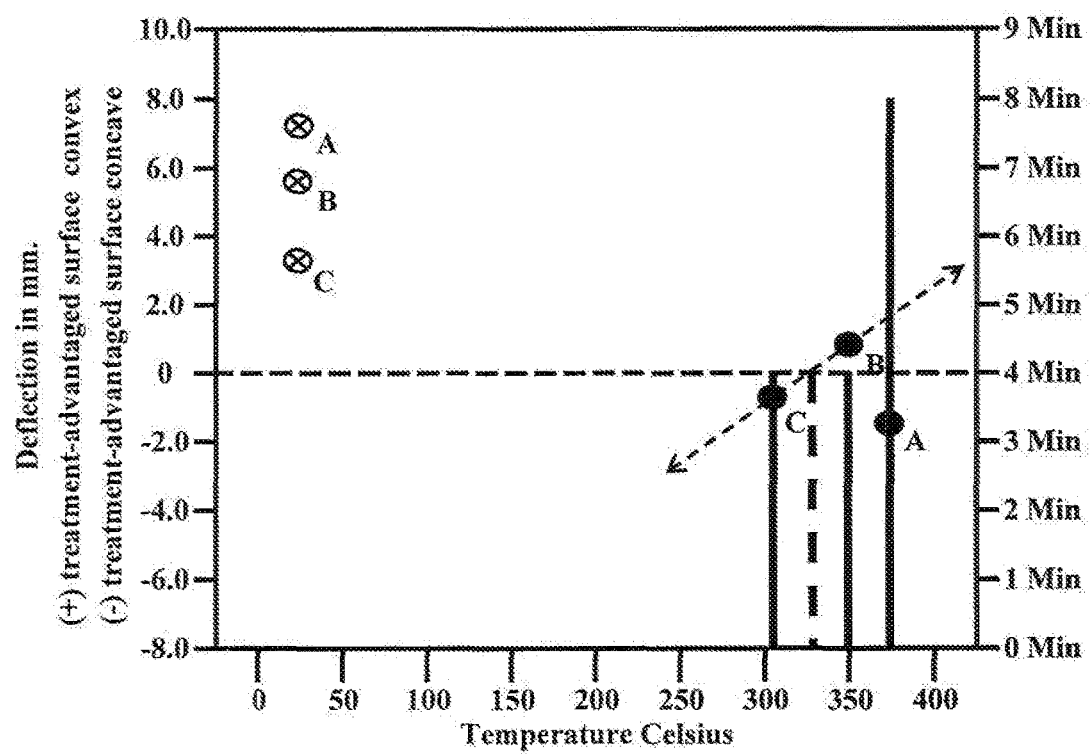
FIG. 2 is a graph showing the deflection of exemplary chemically-strengthened thin glass substrates both before and after reverse ion-exchange is conducted at a defined thermal profile of time at temperature.

The above times and temperatures are time at temperature and exclude a short period of heat-up and cool-down. The thermal profiles are denoted by the vertical black lines on the graph in FIG. 2 representing time at temperature.

Results: Immediately following reverse ion-exchange the coupons were cleaned using warm de-ionized water and the results were as follows:

Sample A

The measured curvature in the glass coupon was a negative 1.6 mm deflection over 412 mm.

| SURFACE REGION | CS | DOL | CT |
|---|---|---|---|
| Treatment-Disadvantaged Surface (Tin Side) | 727 MPa | 45.4 μm | 33.5 MPa |
| Treatment-Advantaged Surface (Non-Tin Side) | 699 MPa | 47.0 μm | 36.3 MPa |

Sample B

The measured curvature in the glass coupon was a positive 0.8 mm deflection over 412 mm.

| SURFACE REGION | CS | DOL | CT |
|---|---|---|---|
| Treatment-Disadvantaged Surface (Tin Side) | 723 MPa | 44.8 μm | 35.6 MPa |
| Treatment-Advantaged Surface (Non-Tin Side) | 677 MPa | 48.8 μm | 36.6 MPa |

Sample C

The measured curvature in the glass coupon was a negative 0.8 mm deflection over 412 mm.

| SURFACE REGION | CS | DOL | CT |
|---|---|---|---|
| Treatment-Disadvantaged Surface (Tin Side) | 745 MPa | 44.9 μm | 36.8 MPa |
| Treatment-Advantaged Surface (Non-Tin Side) | 748 MPa | 45.8 μm | 37.8 MPa |

Reverse ion-exchange was conducted while the eutectic coating of two crystallized salt compounds containing reversing alkali ions was applied to the treatment-advantaged surface (i.e., the surface region corresponding to the non-tin side of the glass) by exposure to a specific thermal profile of time at temperature. It is important to note from the tables that there was no substantial reduction, i.e., greater than 10%, in the surface compressive stress on the treatment-advantaged surface region following reverse ion-exchange. Indeed, the greatest change was −48 MPa on sample "B" which is indicative of mild stress relaxation (about 6.5%) and which is greater than the +/−20 MPa resolution accuracy for each instrument reading. However, there was no meaningful change (i.e., greater than the resolution accuracy of the measuring instrument) on the treatment-disadvantaged surface regions which were not subject to reverse ion-exchange but which were exposed to the thermal profile during the reverse ion-exchange step. Indeed, the greatest change was +10 MPa on sample "C" which was within the +/−20 MPa resolution accuracy for each instrument reading. Additionally there was no meaningful change in the depth of diffusion of any surface region with the greatest change being −2.3 µm on sample "C" which was within the +/−5 µm resolution accuracy for each instrument reading.

The resulting deflection for samples A, B, and C is then measured and shown on the right hand data points. These data points are denoted by solid black circles on the graph in FIG. 2. Again deflection is determined from the surface profile measured by an optical non-contact micrometer to obtain deflection as the peak-to-valley height determined across a line drawn parallel with the long dimension connecting between the short edge mid-points. The deflection which results from the thermal profile of time at temperature is denoted by the solid black circles on the graph in FIG. 2. It is noted reverse ion-exchange conducted at a lower temperature requires a longer time period with a given reverse ion-exchange medium to achieve greater stress relaxation (i.e., net movement in curvature).

Note that from the graph an ideal flatness, a zero curvature, is approximately attained by conducting a reverse ion-exchange step for approximately a 4 minute time at a temperature of 330° C. Of course, this ideal time and temperature may be adjusted depending upon the net curvature revealed in the glass substrate following strengthening by ion-exchange. However the principal remains firm, and the ideal temperature and time for an identical ion-exchange medium is denoted by the finely dotted line with arrows at the ends on the graph in FIG. 2. Of course a time period other than 4 minutes or a temperature other than 330° C. could be used provided data points were also plotted with the induced deflection after reverse ion-exchange. Furthermore it is important again to state that the times are short, not being longer than 8 minutes in the examples provided herein. Also the temperatures are lower, no more than 371° C. in the examples provided herein. It is noted that the net movement of sample "A" at a temperature of 371° C. went from +7.1 mm deflection after ion-exchange to −1.6 mm, for a substantial net movement of −8.7 mm.

Example 2—Reduction of Previously Induced Curvature

The starting material is a soda-lime silicate glass sample 50 mm×50 mm length and with a 1.0 mm thickness, cut from a larger sheet formed by a tin float glass process. The sample is chemically-strengthened by submersion into molten potassium nitrate ($KNO_3$) at 432° C. for 4 hours. The sample is then cooled and rinsed with water to remove solidified salt. The deflection of the chemically-strengthened glass sample is 61 microns.

A 1:1 (w/w) ratio mixture of sodium nitrate ($NaNO_3$) and sodium carbonate ($Na_2CO_3$) is dissolved in 80° C. water. The solution is sprayed onto the non-tin side of the chemically-strengthened glass sample, which is preheated to 150° C. The water evaporates, and a smooth layer of the salt is deposited across the full face on the non-tin side of the sample (the treatment-advantaged surface region). The salt is sprayed in an amount which provides a density of 16 grams of salt per square meter of glass surface. The glass is heated to 349° C. and maintained at that temperature for 4 minutes. The salt is then washed off the glass by spraying the coated glass with warm water. There is a decrease in the curvature of the glass sample of approximately 92%, to 5 microns.

For electronics applications such as cover glasses on handheld mobile telephones, the acceptable curvature is about 0.1% of the linear span corresponding to an allowable curvature of 50 microns for a 50 mm span which the sample coupon satisfies.

Example 3—Reduction of Previously Induced Curvature

The starting material is a sodium alkali-aluminosilicate glass sample 50 mm×50 mm length and with a 0.55 mm thickness, cut from a larger sheet formed by a tin float glass process. The sample is chemically-strengthened by submersion into molten potassium nitrate ($KNO_3$) at 432° C. for 4 hours. The sample is then cooled and rinsed with water to remove solidified salt. The deflection of the chemically-strengthened glass sample is 82 microns.

A 1:1 (w/w) ratio mixture of sodium nitrate ($NaNO_3$) and sodium carbonate ($Na_2CO_3$) is dissolved in 80° C. water. The solution is sprayed onto the non-tin side of the chemically-strengthened glass sample, which is preheated to 150° C. The water evaporates, and a smooth layer of the salt is deposited across the full face on the non-tin side of the sample (the treatment-advantaged surface region). The salt is sprayed in an amount which provides a density of 16 grams of salt per square meter of glass surface. The glass is heated to 349° C. and maintained at that temperature for 4 minutes. The salt is then washed off the glass by spraying the coated glass with warm water. There is a decrease in the curvature of the glass sample of approximately 87%, to 11 microns.

For electronics applications such as cover glasses on handheld mobile telephones, the acceptable curvature is about 0.1% of the linear span corresponding to an allowable curvature of 50 microns for a 50 mm span which the sample coupon satisfies.

Example 4—Purposefully Induced Profile of Curvature by Reverse Ion-Exchange

The starting material is a sodium alkali-aluminosilicate glass sample measuring 412 mm width×127 mm length and with a 0.55 mm thickness, cut from a larger sheet formed by a tin float glass process. The sample is chemically-strengthened by submersion into molten potassium nitrate ($KNO_3$) at 432° C. for 4 hours. The sample is then cooled and rinsed with water to remove solidified salt. The deflection of the chemically-strengthened glass sample is 6.7 mm.

A 1:2 (w/w) ratio mixture of sodium nitrate ($NaNO_3$) and sodium carbonate ($Na_2CO_3$) is dissolved in 80° C. water. The solution is sprayed onto the non-tin side of the chemically-strengthened glass sample, which is preheated to 150° C. The water evaporates, and a smooth layer of the salt is deposited across the full face on the tin side of the sample (the treatment-disadvantaged surface region). The salt is sprayed in an amount which provides a density of 16 grams of salt per square meter of glass surface. The glass is heated to 314° C. and maintained at that temperature for 6 minutes. The salt is then washed off the glass by spraying the coated glass with warm water. There is an increase in the curvature of the glass sample by approximately 119%, to 14.7 mm.

For an example embodiment of a touch screen display in a large format gaming console, the predefined profile of curvature required is a spherical 1,500 mm radius which equates to a depth of bend of 14.2 mm over a span of 412 mm. The acceptable proscribed tolerance for the predefined profile of curvature is +/−1.0 mm on the depth of bend which the sample coupon satisfies.

Example 5—Exemplary Process

Figure 3:
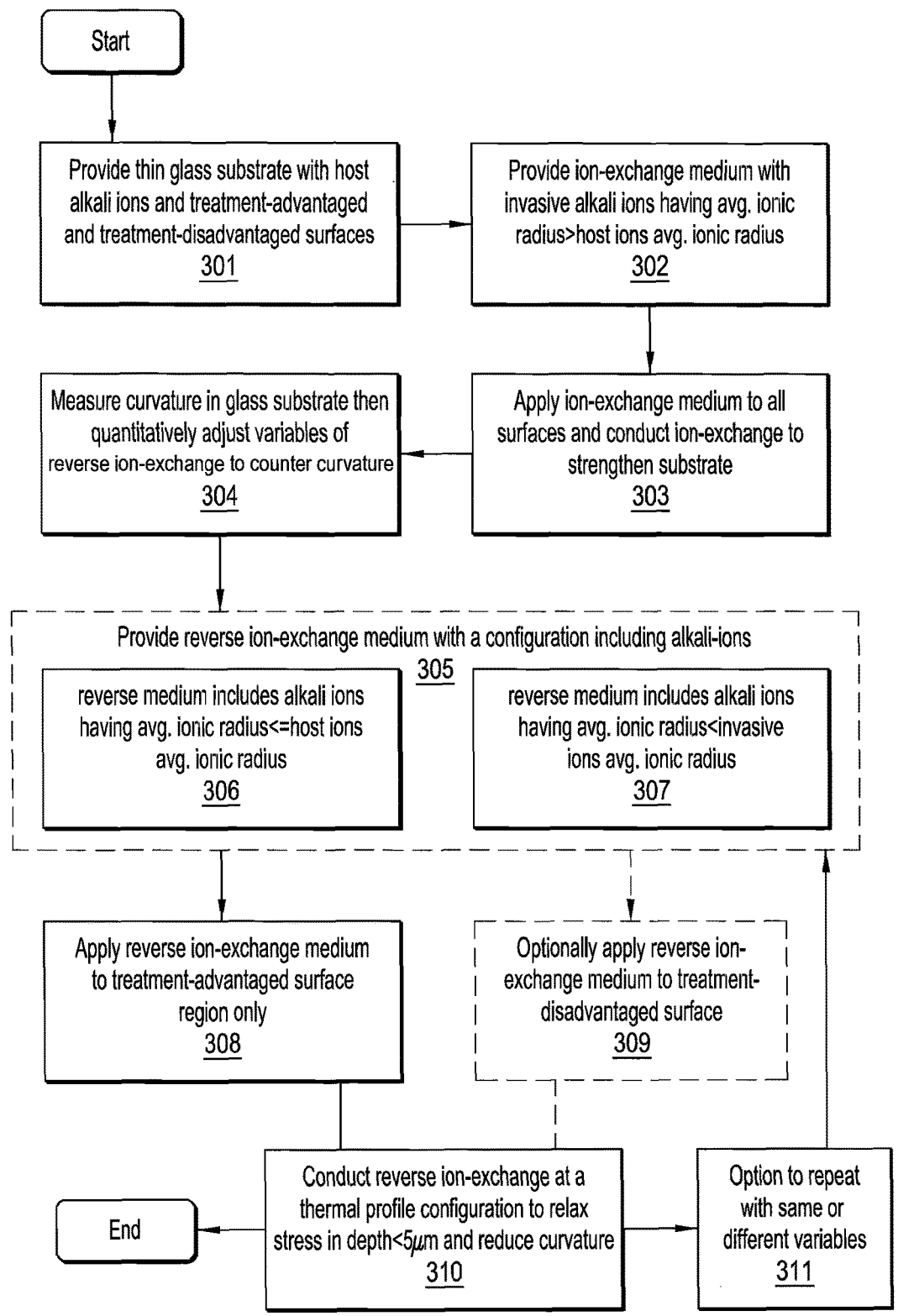
FIG. 3 is a flowchart illustrating an exemplary process for making a chemically-strengthened thin glass substrate according to the present invention.

FIG. 3 is a flowchart illustrating an exemplary process for making a chemically-strengthened substrate in accordance with an advantageous embodiment provided in the present disclosure. At step 301 of FIG. 3, a thin glass substrate is provided with a chemical structure. The glass chemical structure contains host alkali ions having an average ionic radius situated in the surface region. The glass substrate has a treatment-advantaged surface region and a treatment-disadvantaged surface region located opposing each other. At step 302, an ion-exchange medium is provided which contains invasive alkali ions having an average ionic radius that is larger than the average ionic radius of the host alkali ions. At step 303, the ion-exchange medium is applied to the all of the glass surfaces and ion-exchange is conducted while applying the ion-exchange medium to produce a chemically-strengthened substrate.

The exemplary process continues at step 304 where the curvature in the glass substrate is measured by non-contact scanner and then variables of reverse ion-exchange are quantitatively adjusted to counter curvature, most preferably in a single first attempt, although not being specifically limited thereto. The step of reverse ion-exchange may be conducted with varying parameters. At step 304, adjustments may be made to the modification of the curvature of the thin glass substrate during reverse ion-exchange on one or more surface regions, or partial areas thereof, by variation to at least one of time, temperature, and configuration of the reverse ion-exchange medium.

At step 305, a reverse ion-exchange medium is provided. At step 305, adjustments may be made to the modification of the curvature of the thin glass substrate during reverse ion-exchange by variation to at least one of volume of the reverse ion-exchange medium, the species of reversing alkali ions contained therein, the concentration of a species of reversing alkali ions contained therein, and the inclusion of additives therein which modify the rate of reverse ion-exchange.

At step 306, the reverse ion-exchange medium contains reversing alkali ions having an average ionic radius that may be equal to, or smaller than, the average ionic radius of host alkali ions in the glass substrate before ion-exchange. At step 307, the reverse ion-exchange medium contains reversing alkali ions having an average ionic radius that is smaller than the average ionic radius of invasive alkali ions in the glass substrate before ion-exchange.

At step 308, the reverse ion-exchange medium is applied to at least a treatment-advantaged surface region and reverse ion-exchange is conducted while applying the reverse ion-exchange medium. The preferred method is to conduct reverse ion-exchange on only the treatment-advantaged surface region of the glass substrate.

However, at step 309 reverse ion-exchange may also be conducted on the treatment-disadvantaged surface to also relax some of its compressive stress, provided the relaxation of stress is less in sum than the treatment-advantaged surface. The reverse ion-exchange of one surface region, both surface regions, or parts thereof may be conducted simultaneously, sequentially, and in another sequence or combination of sequences.

At step 310, reverse ion-exchange is conducted at a thermal profile configuration while applying a reverse ion-exchange medium to mildly relax compressive stress on the treatment-advantaged region from the surface to preferably not greater 5 µm in depth so as to attain reduced or zero curvature in the chemically-strengthened glass substrate. Reverse ion-exchange may be conducted with more than one thermal profile of time at temperature and/or with more than one configuration of reverse ion-exchange medium. Regardless, the thermal profile for reverse ion-exchange is preferably a specific combination of time at temperature suitable minimize changes to the level and depth of compressive stress across the entire compressed surface regions as a whole.

As an alternative step 311 in the process, the process of reverse ion-exchange may be repeated with the same or different variables if the reduction of curvature in the chemically-strengthened substrate is considered to be insufficient. If the compressive stress on the treatment-advantaged surface has been too greatly reduced and the curvature has become negative, then reverse ion-exchange may be conducted on the treatment-disadvantaged surface region to induce curvature in the opposite direction and thereby remove a negative curvature condition. Upon conclusion, there is a chemically-strengthened substrate having less curvature than was present in the chemically-strengthened glass substrate prior to reverse ion-exchange.

As another alternative step in the process, a reverse ion-exchange medium is applied to at least one of a treatment-advantaged surface region or a treatment-disadvantaged surface region and reverse ion-exchange is conducted while applying the reverse ion-exchange medium. Reverse ion-exchange may also be conducted on an opposing surface region. The reverse ion-exchange of one or more surface regions, or parts thereof, may be conducted simultaneously, sequentially, and in another sequence or combination of sequences.

As another alternative step in the process, reverse ion-exchange is conducted at a thermal profile configuration while applying a reverse ion-exchange medium to mildly relax compressive stress on at least one of the treatment-advantaged or treatment-disadvantaged surface region from the surface to preferably not greater 5 µm in depth to thereby mildly lessen or enhance the curvature so as to attain a predetermined profile of curvature in the chemically-strengthened glass substrate. Reverse ion-exchange may be conducted with more than one thermal profile of time at temperature and/or with more than one configuration of reverse ion-exchange medium. Regardless, the thermal profile for reverse ion-exchange is preferably a specific combination of time at temperature suitable to minimize changes to the level and depth of compressive stress across the entire compressed surface regions as a whole.

As another alternative step in the process, the process of reverse ion-exchange may be repeated with the same or different variables if the reduction or increase to the profile of curvature in the chemically-strengthened substrate is considered to be insufficient. If the compressive stress on a reverse exchanged region has been too greatly reduced, then reverse ion-exchange may be conducted on an opposing surface region to induce curvature in the opposite direction and thereby still attain the predetermined profile of curvature. Upon conclusion, there is a chemically-strengthened substrate having a predetermined profile of curvature which was not present in the chemically-strengthened glass substrate prior to reverse ion-exchange.

Although described specifically throughout the entirety of the disclosure, the representative examples have utility over a wide range of applications, and the above discussion is not intended and should not be construed to be limiting. The terms, descriptions and figures used herein are set forth by way of illustration only and are not meant as limitations. Those skilled in the art recognize that many variations are possible within the spirit and scope of the principles of the invention. While the examples have been described with reference to the figures, those skilled in the art are able to make various modifications to the described examples without departing from the scope of the following claims, and their equivalents.

What is claimed is:

1. A chemically-strengthened thin glass article, which comprises:
    a chemically-strengthened thin float glass substrate having a varied glass chemical structure which comprises metallic tin ions, host sodium alkali metal ions, invasive potassium alkali al ions originating from a chemical-strengthening ion-exchange, and reversing sodium alkali metal ions originating from a strength-relaxing reverse ion-exchange; wherein,
    the glass substrate has opposing major surface regions each having a chemical structure within the varied glass chemical structure and comprising a concentration of larger invasive potassium alkali metal ions from ion-exchange which extend from the surface to a depth of diffusion, a concentration of metallic tin ions from the float process, and wherein in said surface regions the diffusion of invasive potassium alkali metal ions is asymmetrical, such that one major surface region of said surface regions is a treatment-disadvantaged major surface region containing a greater concentration of metallic tin ions in its chemical structure and as compared to an opposing surface region of said surface regions which is treatment-advantaged; and
    wherein in at least one non-perimeter area of the thin glass substrate of the chemically-strengthened thin glass article, at least the treatment-advantaged surface region has been subject to strength relaxing reverse ion-exchange: having a net quantity of smaller sodium alkali metal ions from a reverse ion-exchange medium substituted in place of larger potassium alkali metal ions; and
    wherein in a depth extending from the surface to 5 μm, the average ionic radius of the alkali metal ions located in the treatment-disadvantaged surface region is greater than the average ionic radius of the alkali ions located in the directly opposing treatment-advantaged surface region, and
    wherein in a depth extending from 5 μm to the depth of diffusion, the average ionic radius of the alkali metal ions located in the treatment-advantaged surface region is greater than the average ionic radius of the alkali ions located in the directly opposing treatment-disadvantaged surface region; and
    wherein in the chemically-strengthened thin glass article, the level of surface compressive stress of a non-perimeter area upon which reverse ion-exchange has been conducted is at least 100 MPa and the depth of compressive stress is at least 10 μm, and
    wherein a net curvature induced by the sum of the volumes of the asymmetric chemical structure pivoting about a central tension region of the strengthened substrate is about zero and characterized as having a depth of bend less than 50 microns over a 50 mm span on a portion of a surface thereof subjected to reverse-ion exchange.

2. A chemically-strengthened thin glass article, which is produced by a process comprising the following steps:
    providing a thin float glass substrate having a chemical structure which includes host alkali ions having an average ionic radius which are situated in the surface regions thereof, wherein the thin glass substrate has major surface regions that are opposed to each other, a treatment-advantaged surface region and a treatment-disadvantaged surface region, said surface regions each containing a concentration of metallic tin ions which are in a concentration greater in the treatment disadvantaged surface region than in the treatment-advantaged surface region;
    applying an ion-exchange medium which includes invasive alkali ions having an average ionic radius larger than the average ionic radius of the host alkali ions to the treatment-advantaged surface of the substrate and the treatment-disadvantaged surface of the substrate; and
    conducting ion-exchange to produce a chemically-strengthened glass substrate which has a greater sum of compressive stress in the treatment-advantaged surface region as compared to the sum of compressive stress in the treatment-disadvantaged surface region; and
    providing a reverse ion-exchange medium which contains alkali ions having an average ionic radius that is smaller than the average tonic radius of the invasive ions contained in the ion-exchange medium; and
    applying the reverse ion-exchange medium to at least one non-perimeter area of the thin glass substrate of the chemically-strengthened thin glass article on:
    (1) only the treatment-advantaged surface region and conducting reverse ion-exchange to reduce the sum of compressive stress in the treatment-advantaged surface region, or
    (2) the treatment-advantaged surface region and the directly opposing treatment-disadvantaged surface region and conducting reverse ion-exchange wherein the reverse ion-exchange process differs by at least one of time, temperature and exchange medium between the opposing surface regions to more greatly reduce the sum of compressive stress in the treatment-advantaged surface region than in the directly opposing treatment-disadvantaged surface region; and
    wherein in the chemically-strengthened thin glass article, the level of surface compressive stress of a non-perimeter area upon which reverse ion-exchange has been conducted is at least 100 MPa and the depth of compressive stress is at least 10 μm, and
    wherein, a net curvature induced by the sum of the compressive stresses in said treatment-disadvantaged surface region and said treatment-advantaged surface region pivoting about a central tension region in the strengthened substrate is about zero and characterized as having a depth of bend less than 50 microns over a 50 mm span on a portion of a surface thereof subjected to reverse-ion exchange.

3. The chemically-strengthened thin glass article of claim 2, which is produced by a process further comprising:
    measuring net curvature from that of a true flat plane in the strengthened thin glass article and then conducting a step of reverse ion-exchange to induce a curvature opposed to said measured net curvature, wherein a quantitative adjustment to the step of reverse ion-exchange is made by at least one of time, temperature and exchange medium.

4. The chemically-strengthened thin glass article of claim 1, 2, or 3 wherein reverse ion-exchange is conducted absent a band around the perimeter.

* * * * *